United States Patent
Schell et al.

(10) Patent No.: US 9,637,659 B2
(45) Date of Patent: May 2, 2017

(54) LATEX PRIMER COMPOSITION AND LATEX PRIMED SUBSTRATES

(71) Applicants: Brian Andrew Schell, Honeoye Falls, NY (US); Richard Thomas Kane, Webster, NY (US); James Stephen Honan, Spencerport, NY (US); Christine Joanne Landry-Coltrain, Fairport, NY (US); Charles Leo Bauer, Webster, NY (US)

(72) Inventors: Brian Andrew Schell, Honeoye Falls, NY (US); Richard Thomas Kane, Webster, NY (US); James Stephen Honan, Spencerport, NY (US); Christine Joanne Landry-Coltrain, Fairport, NY (US); Charles Leo Bauer, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 395 days.

(21) Appl. No.: 14/311,435

(22) Filed: Jun. 23, 2014

(65) Prior Publication Data
US 2015/0368501 A1    Dec. 24, 2015

(51) Int. Cl.
*C09D 133/14* (2006.01)
*C09D 133/06* (2006.01)

(52) U.S. Cl.
CPC ....... *C09D 133/14* (2013.01); *C09D 133/068* (2013.01); *Y10T 428/265* (2015.01); *Y10T 428/31511* (2015.04)

(58) Field of Classification Search
None
See application file for complete search history.

(56) References Cited

U.S. PATENT DOCUMENTS

| 4,571,379 | A |   | 2/1986  | Yamazaki et al. |
|-----------|---|---|---------|-----------------|
| 6,162,597 | A |   | 12/2000 | Bauer et al.    |
| 6,165,699 | A | * | 12/2000 | Bauer ............ G03C 1/93 427/386 |
| 2007/0170403 | A1 |   | 7/2007  | Conaghan et al. |
| 2010/0167081 | A1 |   | 7/2010  | Kim et al.      |
| 2013/0319275 | A1 |   | 12/2013 | Fohrenkamm et al. |

FOREIGN PATENT DOCUMENTS

| WO | 2013/063034 |    | 5/2013  |
|----|-------------|----|---------|
| WO | 2013/063188 |    | 5/2013  |
| WO | 2013/165567 |    | 11/2013 |
| WO | 2013/165681 |    | 11/2013 |
| WO | 2013/191825 | A1 | 12/2013 |

* cited by examiner

*Primary Examiner* — Sheeba Ahmed
(74) *Attorney, Agent, or Firm* — J. Lanny Tucker

(57) ABSTRACT

A first polymer latex and second polymer latex can be mixed to form a dried primer layer on a substrate to adhere patterned materials having fine lines. The first polymer latex comprises a first polymer and a first surfactant such that a dried coating of the first polymer latex has a surface polarity of at least 50%. The second polymer latex comprises a second polymer and a second surfactant such that a dried coating of the second polymer latex has a surface polarity of less than or equal to 27%. Moreover, a dried coating of the mixture has a surface polarity of at least 15% and up to and including 50%. Primed substrates are useful for preparing electrically-conductive articles having electrically-conductive fine lines directly on a dried primer layer by applying a patterned material to a substrate. Such articles can be used as touch screen displays in various electronic devices.

16 Claims, 5 Drawing Sheets

LATEX PRIMER COMPOSITION AND LATEX PRIMED SUBSTRATES

RELATED APPLICATIONS

Reference is made hereby to the following copending and commonly assigned patent applications, the disclosures of which are incorporated herein by reference:

U.S. Pat. No. 9,207,533 issued Dec. 8, 2015 to Shukla and Mis;

U.S. Pat. No. 9,188,861 issued Nov. 17, 2015 to Shukla and Mis;

U.S. Pat. No. 9,205,628 issued Dec. 8, 2015 to Honan, Schell, Kane, Landry-Coltrain, and Bauer, entitled "Patterned and Primed Transparent Articles";

U.S. Publication No. 2015/0368805, Dec. 24, 2015, by Landry-Coltrain, Bauer, Honan, Schell, and Kane, entitled "Preparation of Patterned or Electrically-Conductive Articles"; and U.S. Publication No. 2015/0370285, Dec. 24, 2015, by Bauer, Landry-Coltrain, Honan, Schell, and Kane, entitled "Electronic Devices and Precursor Articles."

FIELD OF THE INVENTION

This invention relates to a coating composition and substrates having the coating composition coated on a support (for example, a transparent support). This coating composition performs as a primer layer to adhere patterned materials to the substrate, and comprises a mixture of two different polymer latexes, each containing polymer particles and a surfactant. The resulting patterned articles can be used for various purposes and when the patterns are electrically-conductive materials, the patterned articles can be used as electrically-conductive films in, for example, devices containing touch screens.

BACKGROUND OF THE INVENTION

Primed substrates are used in many industries in order to better adhere overlying layers, patterns, or text. The term "primed" generally refers to the use of a coating, usually a dried polymeric coating, which has good adhesion both to the underlying substrate of a desired smoothness and composition and to overlying materials.

For example, patternable materials can be used in various industries to provide patterns of conductive or non-conductive lines, solid areas, text, grids, electrical circuits, or other shapes. Relief printing members can be used to apply these patterns to various substrates, and the resulting patterns can be further treated to provide electrical conductivity or other properties for use in the electronics, display, or energy industries. For example, electrically-conductive patterns can be designed and prepared on transparent substrates for use in various display devices for example as touch screens.

Polyester and other polymeric films have been well known for decades as useful substrates on which coatings or patterns have been applied. Polymeric films (or articles) of this type are often more suitable for various purposes including printing members, imaging elements, and display devices because of their strength, flexibility, and potential transparency. However, a practical difficulty often arises, depending upon the materials to be applied, in the course of attempting to produce and maintain strong adhesive forces between the polymeric substrates and overlying coatings or patterns because the polymeric substrates are generally highly hydrophobic and overlying coatings or patterns may be less hydrophobic in nature. Alternatively, the polymeric substrates can less hydrophobic than the overlying coatings or patterns.

Many problems arise from poor adhesion in various industries. Touch sensitive panels or displays require very fine lines (on the order of less than 20 µm in width) in predetermined patterns to achieve desired electrical conductivity simultaneously with high visual transparency (or high integrated transmittance).

When adequate adhesion is not achieved or maintained during manufacture and use of fine lines of electrically-conductive materials including electrically-conductive metals or metal precursors, desired electrical-conductivity or capacitance is not achieved. U.S. Patent Application Publication 2007/0170403 (Conaghan et al.) describes these adhesion problems and some proposed solutions by using various adhesive or primer layers on substrates or the incorporation of adhesion promoting compounds into applied conductive "inks" (compositions).

For example, adhesion and various surface properties of flexible and transparent substrates can be improved using polymeric primer layers applied to supporting surfaces of polymeric films. The desire is to better adhere later applied materials especially when those materials are applied in a uniform fashion. Examples of primer layer compositions used for this purpose are described for example in U.S. Pat. No. 6,162,597 (Bauer et al.) and U.S. Pat. No. 6,165,699 (Bauer et al.).

Moreover, U.S. Patent Application Publication 2013/0319275 (Fohrenkamm et al.) describes a means for improving flexographic printed conductive lines by designing the substrate and printed ink to have a unique polarity relationship.

The production of touch screen sensors and other transparent conductive articles in roll-to-roll production methods on flexible and transparent substrates using "additive processes" for deposition of electrically-conductive patterns that provide the functionality of the sensor has been the subject of recent development in the industry. Of particular importance is the ability to produce a touch screen sensor that has both the desired electrical performance as well as appropriate optical properties (transmittance) in the visible portion (touch region) of the touch screen sensor. To achieve the necessary conductive and optical properties, average line widths of electrically-conductive lines in the electrically-conductive grid of less than 10 µm are greatly desired.

The flexible and transparent substrates used in such processes should be optically clear (high integrated transmittance) and colorless and exhibit low haze. The application of electrically-conductive patterns using additive processes such as flexographic printing of electrically-conductive materials or seed metal compositions requires the flexible and transparent substrate to have appropriate surface energy and roughness consistent with the scale of the fine features (for example, fine lines) to be applied. Considerable effort is being exerted in the electronics industry to achieve these necessary features.

WO 2013063188 (Petcavich et al.) describes a method for producing a mutual capacitance touch sensor comprising a dielectric substrate by printing, using a flexographic printing process with at least a first master plate and a first ink, a first pattern on a first side of a dielectric substrate; and curing the printed dielectric article. A second ink can be similarly applied and cured to form a second pattern on a second surface of the substrate. Both patterns can then be electrolessly plated with a conductive material. The resulting dielectric article is described to have a thickness of 1 µm to 1 mm and a preferred surface energy of from 20 Dynes/cm to 90 Dynes/cm.

Continued efforts are being directed to finding a cost effective way to provide flexible and transparent substrates having the desired surface and optical properties for various electronic devices such as touch screen sensors and other optical displays. These efforts are particularly directed at making and using such substrates in high efficiency roll-to-roll manufacturing operations in which the substrates are subjected to various chemical and mechanical operations.

In particular, there is a need in the art for flexible and transparent substrates that exhibit low haze, low color, and surface uniformity and are thus more suitable for adhering fine features such as thin lines, text, or small shapes, and are particularly suitable for fine lines that are electrically-conductive. Flexible and transparent substrates are also desirable that exhibit strong adhesion to "printed" patterns such as those applied by flexographic printing of metal-containing compositions that are inherently or can be further treated to become electrically-conductive.

SUMMARY OF THE INVENTION

The present invention addressed various problems encountered in the art with a coating composition comprising a mixture of a first polymer latex and a second polymer latex, wherein the first polymer latex comprises a first polymer and a first surfactant such that a dried coating of the first polymer latex has a surface polarity of at least 50%, and wherein the second polymer latex comprises a second polymer and a second surfactant such that a dried coating of the second polymer latex has a surface polarity of less than or equal to 27%, and wherein a dried coating of a mixture of the first polymer latex and the second polymer latex has a surface polarity of at least 15% and up to and including 50%.

In addition, the present invention provides a substrate comprising a support and a dried primer layer disposed on at least one supporting surface of the support, the dried primer layer comprising a mixture of:

a first polymer latex comprising a first polymer and a first surfactant such that a dried coating of the first polymer latex has a surface polarity of at least 50%, and a second polymer latex comprising a second polymer and a second surfactant that is different from the first surfactant such that a dried coating of the second polymer latex has a surface polarity of less than or equal to 27%, wherein the dried primer layer has a surface polarity of at least 15% and up to and including 50%.

In particular embodiments of this invention, a transparent polymeric substrate comprises a transparent polyester support and a dried primer layer disposed directly on at least one supporting surface of the transparent polyester support, wherein:

(i) the transparent polymeric substrate has an integrated transmittance of at least 88%;

(ii) the dried primer layer has an average thickness of at least 0.05 µm and up to and including 0.2 µm, and comprises a mixture of:

a first polymer latex comprising a first polymer and a first surfactant, wherein the first polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total first polymer weight, which first polymer has a glass transition temperature of at least 20° C. and up to and including 75° C., and the first surfactant is a sodium α-olefin ($C_{14}$-$C_{16}$) sulfonate;

a second polymer latex comprising a second polymer and a second surfactant that is different from the first surfactant, wherein the second polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total second polymer weight, which second polymer has a glass transition temperature of at least 25° C. and up to and including 75° C., and the second surfactant is an ammonium salt of a sulfated polyethoxy nonylphenol;

(iii) the dried primer layer has a surface polarity of at least 28% and up to and including 50%;

(iv) the weight ratio of the first polymer latex to the second polymer latex is from 1:1 and to and including 2.5:1;

(v) the first surfactant is present in the dried primer layer in an amount of at least 1 weight % and up to and including 3 weight %, based on total dried primer weight;

(vi) the second surfactant is present in the dried primer layer in an amount of at least 0.35 weight % and up to and including 1.1 weight %, based on the total dried primer layer; and (vii) the total amount of the first and second surfactants in the dried primer layer is less than 3.35 weight %, based on the total dried primer layer weight.

The various embodiments of the present invention provide a number of advantages. Most importantly, the compositions and primed substrates provided by the invention exhibit desired surface characteristics for application and adherence of various compositions in patterns containing fine features, including but not limited to lines having an average line width of less than 15 µm or more likely less than 15 µm. For example, such patterns can be provided using a photocurable of thermally curable composition containing metal seed particles, and the patterns can be suitable electrolessly plated to provide electrically-conductive patterns with desired fine features. The substrates and articles containing them exhibit low haze, low color, desired surface uniformity (coating appearance), and high integrated transmittance (at least 88%). These advantages are achieved by "priming" a suitable support material (such as a transparent support material) with a primer composition comprising a mixture of a first polymer latex and a second polymer latex having the properties and compositions described below.

DETAILED DESCRIPTION OF THE INVENTION

Figure 1:
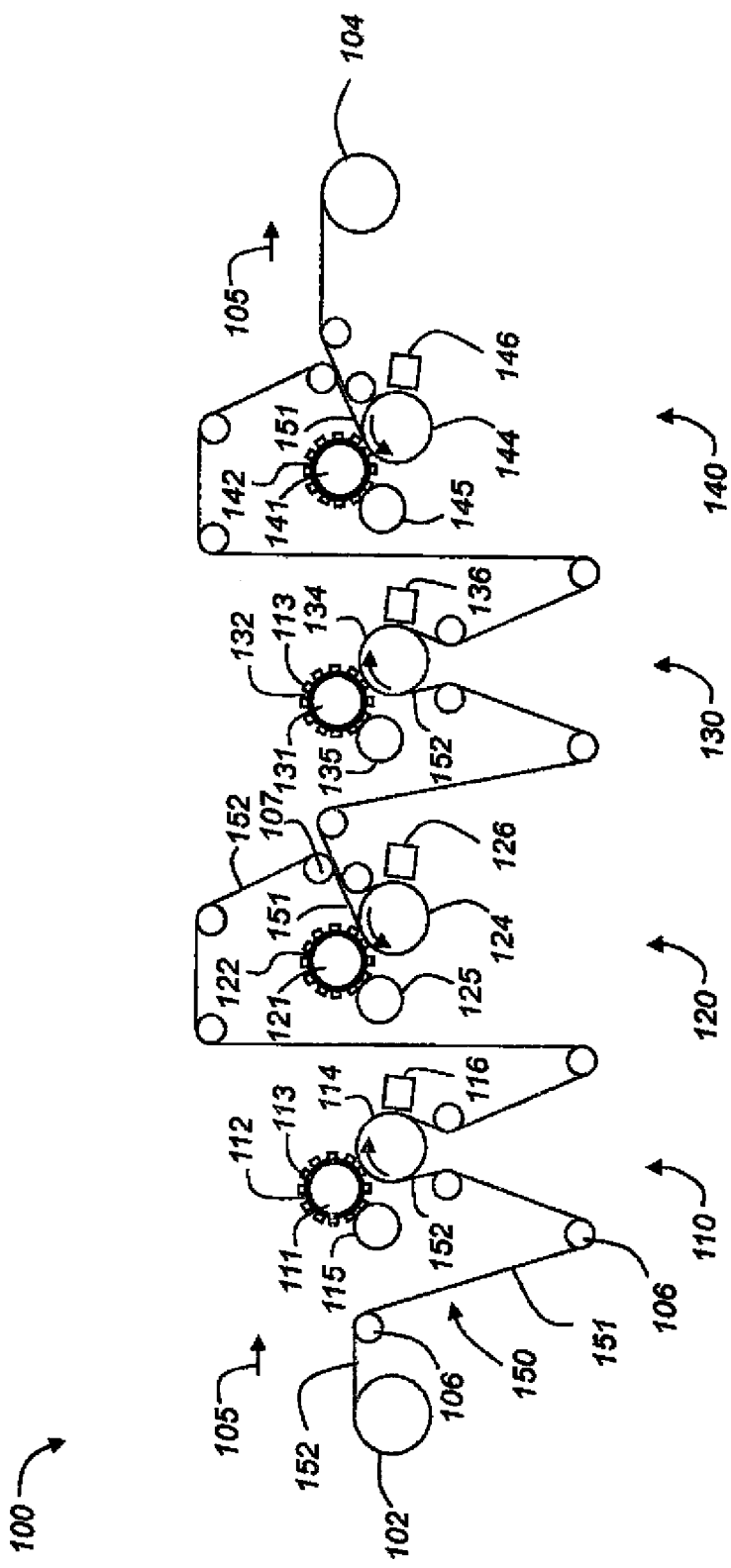
FIG. 1 is a schematic side view of a flexographic printing system useful for roll-to-roll printing (or imaging) on both sides of a substrate of this invention, in which a representative photocurable composition (patterned material) and a method of the present invention are used.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described.

DEFINITIONS

As used herein to define various components of the primer coating compositions, dried primer layers, photocurable and thermally curable compositions, and other compositional features described herein, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

As used herein, unless otherwise indicated, molecular weights are weight average molecular weights that can be determined using known procedures and equipment if the values are not already known from the literature.

Unless otherwise indicated, the term "photocurable or thermally curable composition" refers to chemical compositions that are useful in the practice of the various methods of the present invention and can be provided in the articles in the present invention. Such compositions have requisite chemicals that under certain conditions can be cured, polymerized, or crosslinked.

The terms "curing" and "polymerization" are used herein to mean the combining, for example by covalent bonding, of a large number of smaller molecules, such as monomers or oligomers, in the presence of suitable catalysts or initiators to form very large molecules, that is, macromolecules or polymers. Curing or polymerization can form linear macromolecules or three-dimensional macromolecules that are commonly referred to as crosslinked polymers including branched-chain materials, or both linear and crosslinked (or branched-chain) materials can be formed at the same time. One type of polymerization that can be carried out in the practice of this invention is acid-catalyzed (cationic) polymerization. Free radical polymerization can also be carried out in the practice of this invention. Alternatively, in some embodiments, both acid catalyzed polymerization and free radical polymerization can be carried out simultaneously.

The terms "photocurable" and "curable" are used to define a material (such as an epoxy material) that will polymerize when irradiated with suitable radiation, for example irradiated with radiation such as ultraviolet (UV), visible, or infrared radiation in the presence of an appropriate photoinitiator composition.

Average dry thickness of layers described herein can be the average of two or more separate measurements taken, for example, using electron microscopy or optical microscopy in different locations of a dry layer. Obtaining more than 2 separate measurements can be desirable in certain embodiments.

Similarly, the average dry thickness or width of lines, grid lines, or other pattern features described herein can be the average of two or more separate measurements taken, for example, using electron microscopy.

The term "polymerizable epoxy material" is meant to include any material or compound having one or more oxirane rings that are capable of undergoing polymerization. This term encompasses epoxy-containing monomers, epoxy-containing oligomers, and epoxy-containing crosslinking agents. The singular form of the term is intended to include the plural form of the term. Oligomeric and multifunctional epoxy materials are also useful polymerizable epoxy materials.

The term "electron donor photosensitizer" is meant to refer to a light absorbing compound used to induce photocuring. Upon photoexcitation, the electron donor photosensitizer leads to one-electron reduction of the onium salt.

The term "photoinitiator" is meant to refer to any chemical compound that decomposes into free radicals or chemical fragments when exposed to light, to initiate further reaction. In some embodiments, the photoinitiator is an "onium salt" or an "onium compound" or other photoacid generator that is capable of accepting an electron from an excited electron donor photosensitizer, a process that leads to fragmentation of an onium salt to provide a Brönsted acid that initiates polymerization of the epoxy material. In other embodiments, the photoinitiator decomposes into free radicals that proceed to cause curing, polymerization, or crosslinking of vinyl groups.

"Actinic radiation" is used to refer to any electromagnetic radiation that is capable of producing photochemical or photopolymerization action in accordance with the present invention and that has a wavelength of at least 150 nm and up to and including 750 nm, or even at least 190 nm and up to and including 700 nm. The term "exposing radiation" also refers to such actinic radiation.

The term "visible light" is used herein to refer to electromagnetic radiation having a wavelength (for example, $\lambda_{max}$) of greater than 400 nm to and up to and including 750 nanometers (nm).

The term "UV light" is used herein to refer to electromagnetic radiation having a wavelength (for example, $\lambda_{max}$) of at least 150 nm and up to and including 400 nm.

The terms "near infrared" and "infrared" are used herein to refer to electromagnetic radiation having a wavelength (for example, $\lambda_{max}$) of at least 750 nm and higher, and typically of at least 750 nm and up to and including 1400 nm.

The term "integrated transmittance" is a parameter used to measure "transparency". Thus, when supports, substrates, and articles are referred to as transparent, the integrated transmittance over the visible region of the electromagnetic spectrum (for example from 400 nm to 750 nm) is 80% or more, or more likely at least 88% or even 93% or more, as measured for example using a spectrophotometer and known techniques. In general, the touch regions in the electrically-conductive articles or films will have this high integrated transmittance. However, the electrode connector regions or BUS regions are generally much less transparent and can generally have an integrated transmittance of less than 68%, or less than 50%, or even less than 40% using the same equipment and procedures noted above.

Alternatively, the integrated transmittance can be associated with the calculated percentage of the transparent article, support, or substrate area that is not covered by an electrically-conductive pattern in the touch region.

The term "average line width" in reference to various patterns or patterned materials described herein, refers to a dimension that is determined from two or more separate measurements of the lines in different locations of the same or different lines using appropriate measurement techniques and equipment that would be known to one skilled in the art. More than 2 of such measurements can be desirable in certain embodiments.

The "touch region" on an electrically-conductive surface, portion, film, or other structure refers to the region of an article having patterned materials such electrically-conductive patterns are designed for touching to manipulate images, "apps" or other digital information in a display device. Thus, the touch region is different than electrically-conductive electrode connector regions," "BUS lines," and "BUS regions.

Surface polarity is defined as described below in the Examples.

Uses

The coating compositions, substrates, articles, and methods described herein can be used for a variety of purposes where substrates having the noted properties are needed for further application of materials or forming patterns. For example, the (primer) coating compositions, substrates, and articles described herein are particularly useful for providing electrically-conductive metal patterns having fine features, for example using electroless plating procedures, that can be incorporated into various devices including but not limited to touch screen or other display devices that can be used in numerous industrial and commercial products.

For example, touch screen technology can comprise different touch sensor configurations including capacitive and resistive touch sensors. Resistive touch sensors comprise several layers that face each other with a gap between adjacent layers that may be preserved by spacers formed during manufacturing. A resistive touch screen panel can comprise several layers including two thin, metallic, electrically conductive layers separated by a gap that can be created by spacers. When an object such as a stylus, palm, or fingertip presses down on a point on the panel's outer surface, the two metallic layers come into contact and a connection is formed that causes a change in the electrical current. This touch event is sent to a controller for further processing.

Capacitive touch sensors can be used in electronic devices with touch-sensitive features. These electronic devices can include but are not limited to, televisions, monitors, and projectors that can be adapted to display images including text, graphics, video images, movies, still images, and presentations. The image devices that can be used for these display devices that can include cathode ray tubes (CRT's), projectors, flat panel liquid crystal displays (LCD's), LED systems, OLED systems, plasma systems, electroluminescent displays (ELD's), and field emission displays (FED's). For example, the present invention can be used to prepare capacitive touch sensors that can be incorporated into electronic devices with touch-sensitive features to provide computing devices, computer displays, portable media players including e-readers, mobile telephones and other communicating or digital storage devices.

Systems and methods of fabricating flexible and optically compliant touch sensors in a high-volume roll-to-roll manufacturing process where micro electrically-conductive features can be created in a single pass are possible using the present invention. Photocurable or thermally curable compositions can be used with relief printing members such as flexographic printing plates to form multiple high resolution electrically-conductive images from predetermined pattern designs. Multiple patterns can be printed on one or both supportive sides of the inventive substrate as described in more detail below. For example, one predetermined pattern can be printed on one supporting side of the substrate and a different predetermined pattern can be printed on the opposing supporting side of the substrate. The printed patterns of the photocurable or thermally curable compositions can then be further treated to provide electrically-conductive metal patterns containing fine features, such as for example using electroless metal plating techniques.

Polymer Latexes

A unique composition is provided for the present invention, which composition can be deposited onto a surface using any suitable means is used to provide the advantages of the present invention. Such a composition can also be generally known as a "coating composition", "primer layer composition", or a "primer composition". This coating composition comprises a mixture of at least a first polymer latex and at least one second polymer latex. By using the modifiers "first" and "second, it is not intended to infer that one polymer latex (or polymer) is better than the other polymer latex (or polymer) in any given property, but the modifiers are used merely to distinguish two different polymer latex compositions. Additional polymer latexes can be present in the mixture if desired as long as the desired properties (described herein) are obtained.

First and Second Polymers:

The first and second polymer latexes comprise a first polymer and a second polymer, respectively. When in the latex form or polymeric dispersion, the first and second polymers are generally present in the form of particles that have been formed in micelles using known emulsion polymerization techniques. While each of the first and second polymers can be isolated, they are used in the present invention in mixtures of the first and second latexes and thus, isolation would likely make it harder to use them in coatings.

At least one of the first and second polymers described herein comprises a vinyl polymer comprising recurring units derived at least in part from glycidyl (meth)acrylate (meaning glycidyl acrylate, glycidyl methacrylate, or both), and in most embodiments, each of the first and second polymers is derived at least in part from glycidyl (meth)acrylate. In addition, at least one of the first polymer and second polymer is crosslinkable, and can be crosslinked for example after coating onto a suitable support such as during drying or various heat treatments of the substrate. A skilled worker in the art would know how to provide crosslinking capability in a given polymer by judicious choice in the design of the polymer recurring units and reactive groups.

The first polymer latex used in the present invention comprises one of more first polymers and one or more first surfactants (described below) such that a dried coating of the first polymer latex has a surface polarity of at least 50% (50% or more) or even at least 55% (55% or more). In most embodiments, the first polymer latex consists essentially of two essential components: one or more first polymers and one or more first surfactants.

Particularly useful first polymers are vinyl polymers derived at least in part from one or more glycidyl-functional ethylenically unsaturated polymerizable monomers, such as glycidyl acrylate and glycidyl methacrylate. Thus, the first polymer can be a homopolymer derived from glycidyl (meth)acrylate, but more likely it is a copolymer derived from glycidyl (meth)acrylate and one or more other ethylenically unsaturated polymerizable monomers. The term "glycidyl" refers to a group comprising an oxirane ring attached to an alkyl group having 1 to 4 carbon atoms (linear or branched alkyl groups that can also be further substituted), such as methyl, ethyl, isopropyl, and t-butyl groups.

For example, the first polymer can comprise recurring units derived from glycidyl (meth)acrylate in an amount of at least 75 weight % and up to and including 100 weight %, or at least 75 weight % and up to and including 90 weight %, based on the total weight of the first polymer. Particularly desirable first polymers are thus derived from glycidyl (meth)acrylate and one or more other ethylenically unsaturated polymerizable monomers (co-monomers) that will substantially copolymerize with the glycidyl (meth)acrylate monomers rather than reacting with the glycidyl groups during emulsion polymerization and that will facilitate emulsion polymerization of all ethylenically unsaturated polymerizable monomers within the reaction dispersion. Suitable vinyl co-monomers include but are not limited to, alkyl acrylates and alkyl methacrylates wherein the ester alkyl group has 1 to 4 four carbon atoms; other substituted alkyl acrylates and methacrylate; acrylamide and methacrylamides; vinyl halides such as vinyl chloride; vinylidene halides such as vinylidene chloride; vinyl pyrrolidone; other N-vinyl amides; vinyl pyridines; styrene and styrene derivatives such as α-methyl styrene; butadiene; isoprene; acrylonitrile; methacrylonitrile; and others that would be readily apparent to one skilled in the art. Mixtures of co-monomers can be used if desired. One skilled in the art would be able to use routine experimentation to determine the appropriate amounts of various co-monomers that would provide the desired film-forming properties and surface polarity values described herein.

The first polymer is particularly designed by co-polymerizing one or more glycidyl (meth)acrylates with one or more alkyl (meth)acrylates wherein the ester alkyl group has at least 2 carbon atoms including but not limited to, ethyl acrylate, ethyl methacrylate, n-butyl acrylate, n-butyl methacrylate, cyclohexyl acrylate, cyclohexyl methacrylate, lauryl acrylate, lauryl methacrylate, allyl methacrylate, hydroxyethyl methacrylate, hydroxyethyl acrylate, and others that would be readily apparent to one skilled in the art. Particularly useful co-monomers are the alkyl (meth)acrylates wherein the ester alkyl group has at least 4 carbon atoms, including but not limited to n-butyl acrylate, n-butyl methacrylate, n-hexyl acrylate, n-hexyl methacrylate, and cyclohexyl methacrylate.

The second polymer latex useful in this invention comprises one of more second polymers and one or more second surfactants (described below) such that a dried coating of the second polymer latex has a surface polarity of less than or equal to 28% or less than or equal to 27%. In most embodiments, the second polymer latex consists essentially of two essential components: one or more second polymers and one or more second surfactants.

Particularly useful second polymers are vinyl polymers derived at least in part from one or more glycidyl-functional ethylenically unsaturated polymerizable monomers, such as glycidyl (meth)acrylate, for example glycidyl acrylate and glycidyl methacrylate, as described above for the first polymer. Thus, the second polymer can be a homopolymer derived from glycidyl (meth)acrylate, or a copolymer derived from glycidyl (meth)acrylate and one or more other ethylenically unsaturated polymerizable monomers. The term "glycidyl" is defined above.

Thus, the second polymer can comprise recurring units derived from glycidyl (meth)acrylate in an amount of at least 75 weight % and up to and including 100 weight %, or at least 75 weight % and up to and including 90 weight %, based on the total weight of the second polymer. Particularly desirable second polymers are thus derived from glycidyl (meth)acrylate and one or more other ethylenically unsaturated polymerizable monomers (co-monomers) that will substantially copolymerize with the glycidyl (meth)acrylate monomers rather than reacting with the glycidyl groups during emulsion polymerization and that will facilitate emulsion polymerization of all ethylenically unsaturated polymerizable monomers within the reaction dispersion. Suitable vinyl co-monomers include but are not limited to, alkyl acrylates and alkyl methacrylates wherein the ester alkyl group has 1 to 4 four carbon atoms; other substituted alkyl acrylates and methacrylate; acrylamide and methacrylamides; vinyl halides such as vinyl chloride; vinylidene halides such as vinylidene chloride; vinyl pyrrolidone; other N-vinyl amides; vinyl pyridines; styrene and styrene derivatives such as α-methyl styrene; butadiene; isoprene; acrylonitrile; methacrylonitrile; and others that would be readily apparent to one skilled in the art. Mixtures of co-monomers can be used if desired. As with the first polymer, one skilled in the art would be able to use routine experimentation to determine the appropriate amounts of various co-monomers that would provide the desired film-forming properties and surface polarity values described herein for the second polymer latex.

The second polymer is particularly designed by co-polymerizing one or more glycidyl (meth)acrylates with one or more co-monomers such as one or more alkyl (meth)acrylates wherein the ester alkyl group has at least 2 carbon atoms including but not limited to, ethyl acrylate, ethyl methacrylate, n-butyl acrylate, n-butyl methacrylate, cyclohexyl acrylate, cyclohexyl methacrylate, lauryl acrylate, lauryl methacrylate, allyl methacrylate, hydroxyethyl methacrylate, hydroxyethyl acrylate, and others that would be readily apparent to one skilled in the art. Particularly useful co-monomers are the alkyl (meth)acrylates wherein the ester alkyl group has at least 4 carbon atoms such as n-butyl acrylate, n-butyl methacrylate, n-hexyl acrylate, n-hexyl methacrylate, and cyclohexyl methacrylate.

As noted particularly in the Invention Examples described below, while the first and second polymers can be different materials, it can be useful for the first and second polymers to have the same composition (same glycidyl-functional recurring units and recurring units from co-monomers) or have similar or same molecular weight.

Though the molecular weight of the first and second polymers cannot always be exactly determined because such polymers may have a bridging structure obtained from the glycidyl groups, in general each polymer independently has a molecular weight of at least 10,000 or more likely at least 50,000.

In addition, each of the first and second polymers can independently have a glass transition temperature ($T_g$) of at least 25° C. or more typically at least 40° C., and up to and including 75° C. as determined by Differential Scanning calorimetry (DSC).

The amount of the first polymer in the first polymer latex and the amount of the second polymer in the second polymer latex can be the same or different. In most embodiments, the amount of first polymer in the first polymer latex is at least 10 weight % and up to and including 40 weight %, based on total first polymer latex solids; and the amount of second polymer in the second polymer latex is at least 20 weight % and up to and including 30 weight %, based on total second polymer latex solids.

First and Second Surfactants:

The first polymer latex comprises one or more first surfactants, each of which is an alkyl sulfonate sodium salt wherein the alkyl group has at least 10 carbon atoms. For example, the first surfactant can be a sodium α-olefin ($C_{14}$-$C_{16}$) sulfonate, or the first surfactant can be a compound represented by R—$CH_2$—CH=CH—$CH_2$—S(=O)$_2$O$^-$Na$^+$ wherein R is a $C_{10}$, $C_{11}$, or $C_{12}$ hydrocarbon group, or mixtures of such compounds with different R groups that are any of $C_{10}$ to $C_{12}$ hydrocarbons groups. One useful commercial product containing a first surfactant is Rhodacal® A246L (available for example from Rhodia). Mixtures of such first surfactants can be used if desired.

The total amount of the one or more first surfactants in the first polymer latex is adjusted so that when a mixture of the first polymer latex and the second polymer latex (described below) is applied to a substrate and dried (as a primer layer), the total amount of the one or more first surfactants in that dried primer layer, is at least 1 weight % and up to and including 3 weight %, or typically at least 1.6 weight % and up to and including 2.8 weight %, based on total dried primer layer weight. One skilled in the art would known how much first surfactant to incorporate into the emulsion used to prepare the first polymer latex so that the requisite amount is present in the dried primer layer in view of the mixing weight ratio of first polymer latex and second polymer latex.

The second polymer latex comprises one or more second surfactants, each of which is an alkyl phenol sulfate ammonium salt having at least 3 ethylene oxide units. For example, the second surfactant can be an ammonium salt of a sulfate polyethoxy nonylphenol, or the second surfactant can be represented by R'-phenyl-(O—$CH_2CH_2$)$_n$—S(=O)O$_2$$^-$NH$_4$$^+$ wherein R' is a $C_8$ to $C_{12}$ hydrocarbon group and n is at least 3 and up to and including 10, or more likely n is at least 3 and up to and including 6. One useful commercial product containing a second surfactant is Rhodapex® CO-436 (available for example from Rhodia). Mixtures of such second surfactants can be used if desired.

The total amount of the one or more second surfactants in the second polymer latex is adjusted so that when a mixture of the first polymer latex and the second polymer latex (described below) is applied to a substrate and dried (as a primer layer), the total amount of the one or more second surfactants in that dried primer layer, is at least 0.35 weight % and up to and including 1.1 weight %, or typically at least 0.45 weight % and up to and including 0.9 weight %, based on total dried primer layer weight. One skilled in the art would known how much second surfactant to incorporate into the emulsion to prepare the second polymer latex so that the requisite amount is present in the dried primer layer in view of the mixing weight ratio of first polymer latex and second polymer latex.

The first polymer and the second polymer are generally dispersed as finely divided particles in individual aqueous dispersions that comprise first and second polymer latexes, respectively. When these polymer latexes are mixed according to the present invention, they can be applied to a suitable substrate as a coating formulation in any suitable manner. Some water in each polymer latex can be replaced with a water-miscible organic solvent (such as methanol or acetone).

It is generally desired to use first and second polymer latexes having average first and second polymer particle sizes, respectively and independently, of less than 200 μm, more likely less than 150 μm, and even more desirably less than 100 μm. In order to achieve small and narrow polymer particle size distributions, it may be necessary in the emulsion polymerization for either or both of the first polymer latex and the second polymer latex to include first and second surfactant amounts that exceed the amounts described in the preceding paragraphs. However, the total first and second surfactant amounts can be reduced below the highest limit described for the present invention by the use of dialysis to remove excess first and second surfactants.

Each of the first polymer latex and the second polymer latex can be prepared using emulsion polymerization or obtained as an aqueous dispersion of particulate emulsion polymerizate. The emulsion polymerization procedure including useful conditions and reactants are known in the art and representative details are provided in U.S. Pat. No. 6,162,597 (Columns 5-7) the disclosure of which is incorporated herein by reference. The first and second surfactants described above are included in the preparation of the first polymer latex and second polymer latex, respectively, for example as at least one of the anionic surface active agents. However, the preparation of the first and second polymer latexes is not limited to using only the first and second surfactants, respectively. Representative preparatory methods are provided below with the Examples.

Coating Compositions

Each of the first polymer latex and second polymer latex can independently comprise one or more water-miscible organic solvents in an amount of up to and including 10 weight %, based on the total latex weight; one or more surface active agents; one or more inorganic matting agents (as long as haze is not significantly increased and transparency is not significantly diminished); antistatic agents; acids or bases to adjust pH; and buffers.

It can also be desirable to incorporate one or more crosslinking agents (can also be known in the art as "hardeners") in known amounts to further facilitate crosslinking of the polymer latex particles once they are applied to a support and dried. Useful crosslinking agents include but are not limited to, aldehyde-containing compounds such as formaldehyde and glyoxal, ethyleneimine-containing compounds such as tetramethylene-1,4-bis(ethyleneurea), esters of methane sulfonic acid such as trimethylenebis methanesulfonic acid ester, active vinyl compounds such as bisacroyl urea and methylenedivinylsulfonic acid, glycidyl-containing compounds such as bisphenolglycidyl ether, and isocyanates.

However, it is optimal that neither first polymer latex nor second polymer latex contains significant amounts of coalescing aides such as resorcinol and other compounds described for this purpose in Col. 6, line 53 to Col. 7, line 3 of U.S. Pat. No. 6,162,597 (noted above). It is particularly desired that both first and second polymer latexes comprise less than 1 weight % of such coalescing aides such as resorcinol, based on the total weight of the dried primer layer (described below) when the two polymer latexes are mixture and applied to a support.

Thus, in some embodiments of the composition described herein, a dried primer coating of the composition has a surface polarity of at least 28% and up to and including 50%. In addition, such compositions can have the following properties:

the first polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total first polymer weight, which first polymer has a glass transition temperature of at least 50° C. and up to and including 70° C., and the first surfactant is a sodium α-olefin ($C_{14}$-$C_{16}$) sulfonate;

the second polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total second polymer weight, which second polymer has a glass transition temperature of at least 50° C. and up to and including 70° C., and the second surfactant is an ammonium salt of a sulfated polyethoxy nonylphenol;

a dried coating of the composition has a surface polarity of at least 28% and up to and including 50%;

the weight ratio of the first polymer latex to the second polymer latex in the mixture is from 1:1 and to and including 2.5:1;

the first surfactant is present in a dried coating of the mixture in an amount of at least 1 weight % and up to and including 3 weight %, based on total dry coating weight;

the second surfactant is present in a dried coating of the mixture in an amount of at least 0.35 weight % and up to and including 1.1 weight %, based on the total dry coating weight; and the total amount of the first and second surfactants in a dry coating of the mixture is less than 3.35 weight %, based on the total dry coating weight.

Substrates

The composition ("primer" composition) described above can be applied in a suitable manner to any suitable support for further processing or treatment for a given industrial purpose to form a substrate of this invention. The resulting substrates can be opaque, transparent, or translucent, or a combination thereof having portions that are opaque and portions that are transparent.

For example, the dried primer layer can be formed on any suitable support material as long as it does not inhibit the purpose for which the resulting article is designed. For example, supports can be formed from materials including but not limited to, polymeric films, metals, glasses (untreated or treated for example with tetrafluorocarbon plasma, hydrophobic fluorine, or a siloxane water-repellant material), silicon or ceramic wafers, fabrics, papers, and combinations thereof (such as laminates of various films, or laminates of papers and films). The resulting substrate can be rigid or flexible. Particularly useful support materials are polyesters, polycarbonates, polystyrenes, polyimides, polyamides, and composites thereof.

The support used in the substrate can have any desired dry average thickness that is generally at least 50 μm and up to and including 3,000 μm. Most continuous webs that are used in the present invention would have an average dry thickness (dried primer layer and support) depending upon the eventual use of the article formed therefrom, for example its incorporation into various articles or optical or display devices. For example, the substrate dry thickness (including dried primer layer, support, and any optional layers or coatings) can be at least 50 μm and up to and including 250 μm, and especially for polymeric films, the substrate dry thickness can be at least 80 μm and up to and including 175 μm or at least 100 μm and up to and including 125 μm.

The substrate of the present invention can be provided in various forms, such as for example, individual sheets in any size or shape, and continuous webs such as continuous webs of transparent substrates including transparent polyester supports that are suitable for roll-to-roll operations. Such continuous webs can be divided or formed into individual first, second, and additional portions that can be used to form the same or different patterns of patterned material (described below).

Before or after a dried primer layer is formed on one or both supporting sides of a support, the support material (especially if a polymeric material) can be treated in a suitable manner to improve adhesion of the dried primer composition, to reduce shrinkage of the substrate during manufacture, coating, or further operations described below. For example, it is generally desired that polyester or other polymeric supports are stretched in one or both planar directions (machine and transverse directions) either prior to or after formation of the dried primer layer. However, in most embodiments, transverse and machine direction stretching is carried out using known procedures and conditions after a dried primer layer is formed on one or both supporting sides of the support. Heat treatment (or heat relaxation) after these stretching procedures at a temperature of for example greater than 100° C. and up to and including 150° C. for several minutes, can provide thermal energy sufficient to coalesce first and second polymer particles in the dried primer layer to form a relatively uniform dried primer layer film and to crosslink one or both of the first and second polymers if they have requisite crosslinkable groups.

Other useful support treatments include corona discharge treatment, flame treatment, and various cleaning and washing procedures.

The primer composition described above is generally applied to a suitable support described herein (such as a polyester support including a continuous polyester web) at a sufficient coverage to provide the desired dry thickness of the dried primer layer described herein, for example at a coverage of at least 30 mg solids/$m^2$ and up to and including 300 mg solids/$m^2$ using any of the techniques described herein. The coating process can occur at any time during manufacture of the substrate of this invention such as before biaxial stretching as described above, or after machine direction stretching and before transverse stretching, or after biaxial stretching.

It would also be apparent to one skilled in the art that the desired dry thickness of a given dried primer layer can be achieved by multiple coatings of the same or different primer compositions according to the present invention so that the final dried primer layer can be a composite of multiple sub-layers having the same or different chemical composition and dry thickness. If such a composite of multiple layers is formed, the surface polarity of the final dry primer layer would be, by definition, an evaluation of the outermost surface of the composite dried primer layer.

As noted above, particularly useful substrates comprise a support (comprised of one or more materials described in the preceding paragraph) on which can be directly disposed a dried primer layer that is composed of the composition described herein. The dried primer layer comprises a mixture (for example, coalesced mixture) of a first polymer latex and a second polymer latex as defined above. In addition, the dried primer layer has a surface polarity of at least 15% and up to and including 50%, or of at least 22% and up to and including 45%. It is particularly desirable that the support is compose of one or more transparent polymeric materials such as a polyester, a mixture of polyesters, or a mixture of a polyester and another polymer, and the resulting substrate can have an integrated transmittance of at least 88% and more likely at least 93%. For example, particularly useful transparent support materials can be composed of poly (ethylene terephthalate) and poly(ethylene naphthalate).

While in most embodiments the dried primer layer is disposed directly on the support (meaning that there are no intermediate layers purposely formed or provided between the dried primer layer and the support), it is also possible that the support can be coated with one or more different primer polymers or mixtures of polymers to form one or more "intermediate primer layers" using materials that are generally known for this purpose in the photographic art, and the dried primer layer according to this invention can then be applied directly to the one or more intermediate primer layers. Such intermediate primer layers can be formed on one or both supporting sides of the support, and then the dried primer layer according to the present invention can be directly formed on the intermediate primer layer on one or both supporting sides of the support.

The dried primer layer can be thusly disposed on at least one supportive side of the support, and in many embodiments, the same or different (in composition, thickness, or surface polarity) dried primer layer can be disposed directly on both supporting sides of the support (that is, a first supporting side and a second opposing supporting side). By "supporting side", it is meant to refer to a planar side of the support rather than an edge of the support material. For example, the dried primer composition according to the present invention can be disposed on one supporting side of the support while other (non-inventive) polymer (or primer) layers can be disposed on the opposing supporting side of the support.

A dried primer layer can be formed on at least one supporting side of a support by application of the mixture (composition) of latexes described above using any suitable manner such as dip coating, roll coating, hopper coating, spray coating, spin coating, or any other method that provides a generally uniform coating that can be dried in any suitable manner (such as using procedures and equipment known in the photographic support art). Alternatively, a pattern of the primer composition can be applied to the support (or to any intermediate primer layers thereon), for example, using ink jetting, photolithographic imprinting, "flexographic" printing using relief printing members such as flexographic printing members (for example, flexographic printing plates and flexographic printing sleeves), lithographic printing using lithographic printing plates, and gravure or intaglio printing using appropriate printing members.

The dried primer layer disposed on the support can have several desirable properties. For example, the weight ratio of the dried first polymer latex to the dried second polymer latex in the dried primer layer is from 1:3 and to and including 3:1 or from 1:1 and to and including 2.5:1.

Moreover, the first surfactant (described above) can be present in the dried primer layer in an amount of at least 1 weight % and up to and including 3 weight %, and more typically of at least 1.6 weight % and up to and including 2.8 weight %, based on the total dried primer layer weight.

In addition, the second surfactant is present in the dried primer layer in an amount of at least 0.35 weight % and up to and including 1.1 weight %, or typically of at least 0.45 weight % and up to and including 0.9 weight %, based on the total dried primer layer weight.

The total amount of the first and second surfactants in the dried primer layer is at least 1.35 weight % and up to and including 3.35 weight %, based on the total dried primer layer weight.

It is also useful that the dried primer layer (or composite of sub-layers as described above) has an average dry thickness of at least 0.05 µm and up to and including 0.4 µm, or typically of at least 0.05 µm and up to and including 0.2 µm, or even of at least 0.07 µm and up to and including 0.2 µm. A skilled worker would know how to determine the density of a particular primer composition prepared according to the present invention and then to calculate the wet coverage to be applied to achieve the desired dry thickness of the resulting dried primer layer.

Upon application of a coating comprising a mixture of the first and second polymer latexes as described above to a suitable support, and drying, the mixture of latex particles typically "coalesce" to form a polymer film that generally has uniform composition over the entire supporting surface to which it is applied. In many embodiments, the latex particles can also crosslink among themselves to provide a more durable surface that is more resistant to degradation by organic solvents. Such durable uniform dried primer layer coatings can then provide more suitable surfaces for the application of curable compositions.

Articles

The substrates described above can be used to provide articles in which a patterned material is disposed directly on the dried primer layer that is in turn disposed directly (in most embodiments) on the support (such as a transparent polymeric support). It is particularly useful that even with the patterned material being present, the article can have an integrated transmittance of at least 88% or typically of at least 95%. Such articles can comprise a dried primer layer having the properties described above for the substrates, including the average dry thickness, weight ratio of the first polymer latex to the second polymer latex, the particular compositions and glass transition temperatures of the first and second vinyl polymers in the latexes, and the particular first and second surfactants (and their amounts).

It is also desirable that such dried primer layers in the articles are substantially free of resorcinol, for example less than 1 weight % of resorcinol, or even less than 0.5 weight % based on the total dried primer layer weight.

The patterned materials can be provided in a patternwise fashion in the articles of this invention in any suitable manner, for example using the means and techniques described above for forming the dried primer layers including but not limited to, using flexographic printing members such as flexographic printing plates, flexographic printing cylinders, and flexographic printing sleeves, using intaglio printing, and using gravure printing. A patterned material can also be applied to a substrate using ink jet printing methods and equipment. Once applied, at least a portion of the patterned material can comprise fine lines having an average line width of less than 15 µm or even less than 10 µm. Of course, the patterned material need not be entirely composed of such fine lines, as it can also comprise large areas, text, and various shapes if desired. But, in most embodiments, at least a portion of the patterned material comprises predominantly the fine lines so as to form a grid or pattern of the fine lines. In some embodiments, the entire patterned material on the dried primer layer is composed of such fine lines.

Useful patterned materials generally comprise any suitable composition or "ink" that can be applied to the substrate in a patternwise fashion and that can be used in this form for a particular purpose.

In some embodiments, the term "patterned material" is an "electrically-conductive print material" that is electrically-conductive or that can be further treated to become electrically-conductive. Such materials can be organic, inorganic, or comprise both organic and inorganic components. Useful electrically-conductive print materials generally exhibit a predetermined activity in response to at least an electrical potential even though such materials can also be responsive to other stimuli. Examples of electrically-conductive print materials include but are not limited to, electrically-conductive organic or inorganic polymers (or composites thereof), particles of indium-tin oxide, particles, flakes, or filaments of metals (such as gold, silver, copper, platinum, nickel, iron, aluminum, and palladium), particles of metal complexes, metal alloys, and metal precursors, and combinations thereof. An electrically conductive print material can alternatively be an electrically conductive material precursor such as a metal salt (for example a silver salt like a silver halide or an organic silver salt), or an electroless metallization catalyst such as palladium particles. Particularly useful electrically conductive print materials include silver and silver salts, gold, copper, palladium, platinum, nickel, iron, indium-tin oxide, carbon blacks, and combinations thereof.

Moreover, useful electrically-conductive print materials can be of any form or composition including particulate (or any desired shape), polymeric materials, or non-polymeric molecules. For example, useful particulate or film-forming polymeric electrically-conductive print materials include but not limited to, polythiophenes, polyanilines, polypyrroles, polycarbazoles, polyindoles, polyazepines, polyethylenedioxythiophenes, poly(3-alkylthiophenes), poly(p-phenylene vinylene)'s, poly(p-phenylene)'s, poly(styrene sulfonic acid) (PSS), poly(p-phenylene sulfide), polyacetylene, poly(3,4-ethylene dioxythiophene) (PEDOT), and a mixture of poly(styrene sulfonic acid) and poly(3,4-ethylene dioxythiophene) (PSS:PEDOT).

In some embodiments, the patterned materials or electrically-conductive print materials can comprise or be entirely composed of nanoparticles of electrically-conductive materials, and thus whose size is measured in nanometers (nm), for example, having at least one dimension less than 200 nm and in some embodiments, having an average diameter of at least 3 nm to and including 100 nm. Nanoparticles can be provided or used in the form of clusters. The shape of the nanoparticles is not limited and includes nanospheres, nanorods, and nanocups. For example, useful electrically-conductive print materials can include nanoparticles of carbon such as carbon black, carbon nanotubes, graphene, and equivalent carbon-containing materials. Metal nanoparticles and dispersions of gold, silver, palladium, platinum, and copper are also useful in patterned materials.

More particularly, the printed materials used in this invention comprises particles (such as nanoparticles) of electrically-conductive metals (or precursors thereof) such as particles of any of silver, gold, copper, palladium, platinum, nickel, and iron, or combinations thereof, which metal particles can be dispersed within a photocurable or thermally curable composition as described below. Precursors of such metals, such as salts or metal-ligand complexes of each metal, can also be used. In addition, indium tin oxide can be incorporated into a patterned material.

In general, the solid materials of the patterned materials are formulated by being dispersed, dissolved, or suspended in a suitable carrier liquid, thereby forming a liquid composition ("ink") for application to a substrate as described herein, and particularly using a flexographic printing member as described herein. The carrier liquids used for this purpose can include organic solvent(s) and water as long as they are compatible with and do not react with (are inert) the solid components of the patterned material. For example, the carrier liquid can be one or more organic solvents capable of dispersing or suspending the solid components such as metal particles in solution sufficient to carry out the method of this invention. In some embodiments as described below, the carrier liquid can be a reactive component of a photocurable or thermally curable composition that is part of the patterned material.

The patternable material formulation should at least be capable of wetting at least the uppermost relief surface of a flexographic printing member as this is the desirable method for applying the patterned material to the dried primer layer of the substrate during the method of this invention. The carrier liquid can have some volatility, and can also cause a certain amount of swelling in the flexographic printing member, depending upon the type of composition from which the flexographic printing member is prepared. Thus, it is advantageous to use a carrier liquid that will not attack or adversely affect the stability and dimensional size of the elastomeric relief surface of the flexographic printing member. The art provides sufficient teaching relating to suitable carrier liquids for a particular patterned material. Representative useful carrier liquid solvents include but are not limited to, alcohols (such as isopropyl alcohol, 2-ethyl hexanol, and α-terpenol), acetates (such as ethyl acetate), water, hydrocarbons (such as toluene and cyclohexane), and combinations of miscible solvents.

In general, before application to a substrate, a patterned material generally has a viscosity of at least 1 cps and up to and including 1500 cps, or typically of at least 100 cps and up to and including 1000 cps. Higher viscosity patterned materials can be used if desired. Viscosity can be measured using a conventional means and equipment such as a Brookfield Viscometer DV-II+Pro (Brookfield Engineering Laboratories).

Some useful patterned materials include but are not limited to, electrically-conductive inks containing electrically-conductive particles such as metal flakes or particles. Electrically-conductive inks include electrically-conductive silver-containing inks (such as inks comprising silver nanoparticles), gold-containing inks, copper-containing inks, carbon-containing inks, palladium-containing inks, and other inks containing "seed" materials for electroplating or electroless plating. Some of such inks can be obtained commercially from sources such as InkTec (California), Flint Ink Corporation (Michigan), Method Development Company (Chicago), and Novacentrix (Austin, Tex.). Some of these "inks" can be used as a carrier liquid while other inks comprise both a carrier liquid and one or more electrically-conductive components.

In some embodiments, the patterned materials can further comprise a colorant including but not limited to, dyes, optical absorbers, pigments, opacifiers, and any material that modifies the transmissive or reflective property of the patterned material at any time during the method of this invention.

As noted above, the patterned materials can be photocurable or thermally curable. "Photocurable" refers to a composition that can be polymerized or crosslinked upon exposure to suitable photocuring radiation. For example, photocuring can take place upon exposure of the patterned material comprising suitable photocurable components using suitable radiation for example, having a $\lambda_{max}$ of at least 150 nm and up to and including 750 nm, or more likely using radiation having a $\lambda_{max}$ of at least 150 nm and up to and including 400 nm. Photoexposure can be carried out using suitable sources of such radiation for a suitable time to provide the needed curing energy. A skilled worker would know how to optimize the conditions for achieving desired polymerization or crosslinking.

Useful thermal curing processes can also be carried out by heating the patterned material to a temperature of at least 110° C. and up to and including 150° C. using a suitable source of heat such a hotplate, oven, infrared heating (for example, exposure to a near-infrared- or infrared-emitting laser), or other heating apparatus, for a sufficient time to obtain desired polymerization or crosslinking such as at least 10 minutes and up to and including 30 minutes. A skilled artisan can readily determine the optimal heating temperature and time conditions that would be desirable to achieve the desired polymerization or crosslinking.

More particularly, the patterned material can be a photocurable composition comprising metal particles as described above and a free radical curable composition, an acid catalyzed curable composition, or a mixture of both a free radical curable composition and an acid catalyzed curable composition.

Free radical curable compositions generally comprise one or more materials that upon exposure to suitable radiation generate free radicals that in turn cause polymerization or crosslinking of reactive monomers, oligomers, or polymers are also present. The various required and optional components are generally carried within one or more solvents (carrier solvents) that can be distinct chemical compounds or they can also be compounds reactive to free radicals (for example, free radical reactive monomers such as acrylates that also act as carrier solvents). Many such free radical curable compositions are described in the journal and patent literature.

Similarly, acid catalyzed curable compositions are also known in the art and generally comprise one or more compounds that generate an acid moiety upon exposure to suitable radiation, which acid moiety then catalyzes polymerization or crosslinking of suitable chemical compounds designed for such chemical environment.

In still other patterned materials, a photocurable composition can include mixtures of chemicals that are both free radical curable and acid catalyzed curable. When both types of curing chemistries are used, the resulting crosslinked matrix can constitute an interpenetrating polymer network (IPN) including the crosslinked materials. This increased crosslinking density can further increase chemical resistance and hardness and provide superior properties for the eventual electrically-conductive metal patterns comprising electrically-conductive fine lines.

(a) Photopolymerizable Epoxy Materials

The cationically polymerizable epoxy materials ("epoxies") are organic compounds having at least one oxirane ring, which oxirane ring is shown in the following formula:

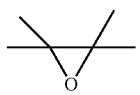

that is polymerizable by a ring opening mechanism. Such epoxy materials, also called "epoxides", include monomeric epoxy compounds and epoxides of the polymeric type and can be aliphatic, cycloaliphatic, aromatic or heterocyclic. These materials generally have, on the average, at least one polymerizable epoxy group per molecule, or typically at least about 1.5 and even at least about 2 polymerizable epoxy groups per molecule. Polymeric epoxy materials include linear polymers having terminal epoxy groups (for example, a diglycidyl ether of a polyoxyalkylene glycol), polymers having skeletal (backbone) oxirane units (for example, polybutadiene polyepoxide), and polymers having pendant epoxy groups (for example, a glycidyl methacrylate polymer or copolymer).

The polymerizable epoxy materials can be single compounds or they can be mixtures of different epoxy materials containing one, two, or more epoxy groups per molecule. The "average" number of epoxy groups per molecule is determined by dividing the total number of epoxy groups in the epoxy material by the total number of epoxy-containing molecules present.

The epoxy materials can vary from low molecular weight monomeric materials to high molecular weight polymers and they can vary greatly in the nature of the backbone and substituent (or pendant) groups. For example, the backbone can be of any type and substituent groups thereon can be any group that does not substantially interfere with cationic photocuring process desired at room temperature. Illustrative of permissible substituent groups include but are not limited to, halogens, ester groups, ethers, sulfonate groups, siloxane groups, nitro groups, and phosphate groups. The molecular weight of the epoxy materials can be at least 58 and up to and including 100,000, or even higher.

Useful epoxy materials include those that contain cyclohexene oxide groups such as epoxycyclohexane carboxylates, such as 3,4-epoxycyclohexylmethyl-3,4-epoxycyclohexane carboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxy materials of this nature is provided in U.S. Pat. No. 3,117,099 (Proops et al.). Still other useful epoxy materials include glycidyl ether monomers that are glycidyl ethers of polyhydric phenols obtained by reacting a polyhydric phenol with an excess of a chlorohydrin such as epichlorohydrin [for example, the diglycidyl ether of 2,2-bis-(2,3-epoxypropoxyphenol)-propane].

Many commercially available epoxy materials are useful including glycidyl ethers such as bisphenol-A-diglycidyl ether (DGEBA), glycidyl ethers of bisphenol S and bisphenol F, butanediol diglycidyl ether, bisphenol-A-extended glycidyl ethers, phenol-formaldehyde glycidyl ethers (epoxy novolacs) and cresol-formaldehyde glycidyl ethers (epoxy cresol novolacs), epoxidized alkenes such as 1,2-epoxyoctane, 1,2,13,14-tetradecane diepoxide, 1,2,7,8-octane diepoxide, octadecylene oxide, epichlorohydrin, styrene oxide, vinyl cyclohexene oxicyclohexene oxide, glycidol, glycidyl methacrylate, diglycidyl ether of Bisphenol A (for example, those available under the EPON trademark such as Epon™ 828, Epon™ 825, Epon™ 1004, and Epon™ 1010 from Momentive, DER-331, DER-332, and DER-334 resins from Dow Chemical Co.), vinyl cyclohexene dioxide (for example, ERL-4206 resin from Polyscience), 3,4-epoxycyclohexylmethyl-3,4-epoxycyclohexene carboxylate (for example, ERL-4221, UVR 6110, or UVR 6105 resin from Dow Chemical Company), 3,4-epoxy-6-methylcyclohexylmethyl-3,4-epoxy-6-methyl-cyclohexene carboxylate (from Pfalz and Bauer), bis(3,4-epoxy-6-methylcyclohexylmethyl) adipate, bis(2,3-epoxy-cyclopentyl) ether, aliphatic epoxy modified with polypropylene glycol, dipentene dioxide, epoxidized polybutadiene (for example, Oxiron 2001 resin from FMC Corp.), silicone resin containing epoxy functionality, flame retardant epoxy resins (for example, DER-580 resin, a brominated bisphenol type epoxy resin available from Dow Chemical Co.), 1,4-butanediol diglycidyl ether of phenol formaldehyde novolak (for example, DEN-431 and DEN-438 resins from Dow Chemical Co.), resorcinol diglycidyl ether (for example, CYRACURE™ resin from Dow Corning Corp.), 2-(3,4-epoxycyclohexyl-5, 5-spiro-3,4-epoxy)cyclohexane-meta-dioxane, 2-(3,4-epoxycyclohexyl-5,5-spiro-3,4-epoxy)cyclohexane-meta-dioxane, vinyl cyclohexene monoxide, 1,2-epoxyhexadecane (for example, CYRACURE™ resin from Dow Corning Corp.), alkyl glycidyl ethers such as HELOXY™ Modifier 7 and HELOXY™ Modifier 8 (from Momentive), butyl glycidyl ether (for example, HELOXY™ Modifier 61 from Momentive), cresyl glycidyl ether (for example, HELOXY™ Modifier 62 from Momentive), p-tert butylphenyl glycidyl ether (for example, HELOXY™ Modifier 65 from Momentive), polyfunctional glycidyl ethers such as diglycidyl ether of 1,4-butanediol (for example, HELOXY™ Modifier 67 from Momentive), diglycidyl ether of neopentyl glycol (for example, HELOXY™ Modifier 68 from Momentive), diglycidyl ether of cyclohexanedimethanol (for example, HELOXY™ Modifier 107 from Momentive), trimethylol ethane triglycidyl ether (for example, HELOXY™ Modifier 44 from Momentive), trimethylol propane triglycidyl ether (for example, HELOXY™ Modifier 48 from Momentive), polyglycidyl ether of an aliphatic polyol (for example, HELOXY™ Modifier 84 from Momentive), polyglycol diepoxide (for example, HELOXY™ Modifier 32 from Momentive), bisphenol F epoxides (for example, EPN-1138 or GY-281 resin from Huntman Advanced Materials), and 9,9-bis>4-(2,3-epoxypropoxy)-phenyl fluorenone (for example, Epon™ 1079 resin from Momentive).

Still other useful epoxy materials are resins such as copolymers derived from acrylic acid esters reacted with glycidol such as glycidyl acrylate and glycidyl methacrylate, copolymerized with one or more ethylenically unsaturated polymerizable monomers. Other useful epoxy materials are epichlorohydrins such as epichlorohydrin, alkylene oxides such as propylene oxide and styrene oxide, alkenyl oxides such as butadiene oxide, and glycidyl esters such as ethyl glycidate. Still other useful epoxy materials are silicones having an epoxy functionality or group such as cyclohexylepoxy groups, especially those epoxy materials having a silicone backbone. Commercial examples of such epoxy materials include UV 9300, UV 9315, UV 9400, UV 9425 silicone materials that are available from Momentive.

Polymeric epoxy materials can optionally contain other functionalities that do not substantially interfere with cationic photocuring of the photopolymerizable composition at room temperature. For example, the photopolymerizable epoxy materials can also include free-radically polymerizable functionality.

The photopolymerizable epoxy material can comprise a blend or mixture of two or more different epoxy materials. Examples of such blends include two or more molecular weight distributions of photopolymerizable epoxy materials, such as a blend of one or more low molecular weight (below 200) epoxy materials with one or more intermediate molecular weight (from 200 to 10,000) photopolymerizable epoxy materials, or one or more of such photopolymerizable epoxy materials with one or more higher molecular weight (above about 10,000) epoxy materials.

The photopolymerizable epoxy materials can be used to provide binder function if desired for given utilities. Otherwise, non-photocurable polymers or resins can be included for this purpose if needed. Alternatively, the photocurable acrylates described below can be used to provide a binder function.

One or more photopolymerizable epoxy materials are included in the photopolymerizable composition in a suitable amount to provide the desired efficient photocuring or photopolymerization. For example, the one or more photopolymerizable epoxy materials are present in an amount of at least 10 weight and up to and including 95 weight %, based on the total weight of all four (a) through (d) components in the photocurable composition.

(b) Photoacid Generators

Various compounds can be used to generate a suitable acid to participate in the photocuring of the photopolymerizable composition described herein. Some of these "photoacid generators" are acidic in nature and others are non-ionic in nature. Other useful photoacid generators besides those described below would be readily apparent to one skilled in the art in view of the teaching provided herein. The various compounds useful as photoacid generators can be purchased from various commercial sources or prepared using known synthetic methods and starting materials.

(i) Onium Salts

Onium salt acid generators include but are not limited to, salts of diazonium, phosphonium, iodonium, or sulfonium salts including polyaryl diazonium, phosphonium, iodonium, and sulfonium salts. The iodonium or sulfonium salts include but not limited to, diaryliodonium and triarylsulfonium salts. Useful counter anions include but are not limited to complex metal halides, such as tetrafluoroborate, hexafluoroantimonate, trifluoromethanesulfonate, hexafluoroarsenate, hexafluorophosphate, and arenesulfonate. The onium salts can also be oligomeric or polymeric compounds having multiple onium salt moieties as well as molecules having a single onium salt moiety.

Examples of useful aromatic iodonium salts include but are not limited to, diphenyliodonium tetrafluoroborate; di(4-methylphenyl)iodonium tetrafluoroborate; phenyl-4-methylphenyliodonium tetrafluoroborate; di(4-heptylphenyl)iodonium tetrafluoroborate; di(3-nitrophenyl)iodonium hexafluorophosphate; di(4-chlorophenyl)iodonium hexafluorophosphate; di(naphthyl)iodonium tetrafluoroborate; di(4-trifluoromethylphenyl)iodonium tetrafluoroborate; diphenyliodonium hexafluorophosphate; di(4-methylphenyl)iodonium hexafluorophosphate; diphenyliodonium hexafluoroarsenate; di(4-phenoxyphenyl)iodonium tetrafluoroborate; phenyl-2-thienyliodonium hexafluorophosphate; 3,5-dimethylpyrazolyl-4-phenyliodonium hexafluorophosphate; diphenyliodonium hexafluoroantimonate; 2,2'-diphenyliodonium tetrafluoroborate; di(2,4-dichlorophenyl)iodonium hexafluorophosphate; di(4-bromophenyl)iodonium hexafluorophosphate; di(4-methoxyphenyl)iodonium hexafluorophosphate; di(3-carboxyphenyl)iodonium hexafluorophosphate; di(3-methoxycarbonylphenyl)iodonium hexafluorophosphate; di(3-methoxysulfonylphenyl)iodonium hexafluorophosphate; di(4-acetamidophenyl)iodonium hexafluorophosphate; di(2-benzothienyl)iodonium hexafluorophosphate; and diphenyliodonium hexafluoroantimonate; and mixtures thereof. Such compounds can be prepared by metathesis of corresponding aromatic iodonium simple salts (such as, for example, diphenyliodonium bisulfate) in accordance with the teachings of Beringer et al., *J. Am. Chem. Soc.* 81, 342 (1959).

Useful iodonium salts can be simple salts (for example, containing an anion such as chloride, bromide, iodide, or $C_4H_5SO_3^-$) or a metal complex salt (for example, containing $SbF_6^-$, $PF_6^-$, $BF_4^-$, tetrakis(perfluorophenyl)borate, or $SbF_5OH_{31}AsF_6^-$). Mixtures of any of these iodonium salts of the same or different class can be used if desired.

Useful sulfonium salts include but are not limited to, triaryl-substituted salts such as mixed triarylsulfonium hexafluoroantimonates (for example, commercially available as UVI-6974 from Dow Chemical Company), mixed triarylsulfonium hexafluorophosphates (for example, commercially available as UVI-6990 from Dow Chemical Company), and arylsulfonium hexafluorophosphates (for example, commercially available as SarCa™ KI85 from Sartomer Company).

One or more onium salts (such as an iodonium salt or a sulfonium salt) are generally present in the photopolymerizable composition in an amount of at least 0.05 weight % and up to and including 10 weight %, or typically at least 0.1 weight % and up to and including 10 weight %, based on the total weight of the all four (a) through (d) components.

(ii) Nonionic Photoacid Generators

Besides onium salts described above, nonionic photoacid generators are also useful. Such compounds include but are not limited to, diazomethane derivatives such as, for example, bis(benzenesulfonyl)-diazomethane, bis(p-toluenesulfonyl)diazomethane, bis(xylenesulfonyl)-diazomethane, bis(cyclohexylsulfonyl)-diazomethane, bis(cyclopentylsulfonyl) diazomethane, bis(n-butylsulfonyl) diazomethane, bis(iso-butylsulfonyl)-diazomethane, bis(sec-butylsulfonyl)diazomethane, bis(n-propylsulfonyl) diazomethane, bis(iso-propylsulfonyl)-diazomethane, bis(tert-butylsulfonyl) diazomethane, bis(n-amylsulfonyl)diazomethane, bis(isoamylsulfonyl)-diazomethane, bis(sec-amylsulfonyl)diazomethane, bis(tert-amylsulfonyl) diazomethane, 1-cyclohexylsulfonyl-1-(tert-butyl sulfonyl) diazomethane, 1-cyclohexylsulfonyl-1-(tert-amylsulfonyl) diazomethane, and 1-tert-amylsulfonyl-1-(tert-butyl sulfonyl)diazomethane.

Nonionic photoacid generators can also include glyoxime derivatives such as, for example, bis-o-(p-toluenesulfonyl)-α-dimethylglyoxime, bis-o-(p-toluenesulfonyl)-α-diphenylglyoxime, bis-o-(p-toluenesulfonyl)-α-dicyclohexyl-glyoxime, bis-o-(p-toluenesulfonyl)-2,3-pentanedione-glyoxime, bis-o-(p-toluenesulfonyl)-2-methyl-3,4-pentane-dioneglyoxime, bis-o-(n-butanesulfonyl)-α-dimethylglyoxime, bis-o-(n-butanesulfonyl)-α-diphenylglyoxime, bis-o-(n-butanesulfonyl)-α-dicyclohexylglyoxime, bis-o-(n-butanesulfonyl)-2,3-pentanedioneglyoxime, bis-o-(n-butanesulfonyl)-2-methyl-3,4-pentanedioneglyoxime, bis-o-(methanesulfonyl)-α-dimethylglyoxime, bis-o-(trifluoromethanesulfonyl)-α-dimethylglyoxime, bis-o-(1,1,1-trifluoroethanesulfonyl)-α-dimethylglyoxime, bis-o-(t-butanesulfonyl)-α-dimethylglyoxime, bis-o-(perfluorooctanesulfonyl)-α-dimethylglyoxime, bis-o-(cyclohexane-sulfonyl)-α-dimethylglyoxime, bis-o-(benzenesulfonyl)-α-dimethylglyoxime, bis-o-(p-fluorobenzenesulfonyl)-α-dimethylglyoxime, bis-o-(p-t-butylbenzenesulfonyl)-α-dimethylglyoxime, bis-o-(xylenesulfonyl)-α-dimethylglyoxime, or bis-o-(camphorsulfonyl)-α-dimethylglyoxime.

Such photoacid generators further include bissulfone derivatives such as, for example, bisnaphthylsulfonylmethane, bistrifluoromethylsulfonylmethane, bismethylsulfonylmethane, bisethylsulfonylmethane, bispropylsulfonylmethane, bisisopropyl-sulfonylmethane, bis-p-toluenesulfonylmethane, bisbenzenesulfonylmethane, 2-cyclohexyl-carbonyl-2-(p-toluenesulfonyl)propane (β-ketosulfone derivative), and 2-isopropyl-carbonyl-2-(p-toluenesulfonyl)propane (β-ketosulfone derivative).

Other classes of useful nonionic photoacid generators include disulfono derivatives such as, for example, diphenyl disulfone and dicyclohexyl disulfone; nitrobenzyl sulfonate derivatives such as, for example, 2,6-dinitrobenzyl p-toluenesulfonate and 2,4-dinitrobenzyl p-toluenesulfonate; sulfonic acid ester derivatives such as, for example, 1,2,3-tris (methanesulfonyl-oxy)benzene, 1,2,3-tris(trifluoromethanesulfonyloxy)benzene, and 1,2,3-tris(p-toluenesulfonyloxy)benzene; and sulfonic acid esters of N-hydroxyimides such as, for example, N-hydroxysuccinimide methanesulfonate, N-hydroxy-succinimide trifluoromethanesulfonate, N-hydroxysuccinimide ethanesulfonate, N-hydroxysuccinimide 1-propanesulfonate, N-hydroxysuccinimide 2-propanesulfonate, N-hydroxysuccinimide 1-pentanesulfonate, N-hydroxysuccinimide 1-octanesulfonate, N-hydroxysuccinimide p-toluenesulfonate, N-hydroxysuccinimide p-methoxybenzenesulfonate, N-hydroxysuccinimide 2-chloroethanesulfonate, N-hydroxysuccinimide benzenesulfonate, N-hydroxysuccinimide 2,4,6-trifluoro-benzenesulfonate, N-hydroxysuccinimide 2,4,6-trimethyl-benzenesulfonate, N-hydroxysuccinimide 2,4,6-trichloro-benzenesulfonate, N-hydroxysuccinimide 4-cyano-benzenesulfonate, N-hydroxysuccinimide 1-naphthalenesulfonate, N-hydroxysuccinimide 2-naphthalenesulfonate, N-hydroxy-2-phenylsuccinimide methanesulfonate, N-hydroxymaleimide methanesulfonate, N-hydroxymaleimide ethanesulfonate, N-hydroxy-2-phenylmaleimide methanesulfonate, N-hydroxyglutarimide methanesulfonate, N-hydroxyglutarimide benzenesulfonate, N-hydroxyphthalimide methanesulfonate, N-hydroxyphthalimide benzenesulfonate, N-hydroxyphthalimide trifluoromethanesulfonate, N-hydroxyphthalimide p-toluenesulfonate, N-hydroxynaphthalimide methanesulfonate, N-hydroxynaphthalimide benzenesulfonate, N-hydroxy-5-norbornene-2,3-dicarboxylmide methanesulfonate, N-hydroxy-5-norbornene-2,3-dicarboxylmide trifluoromethanesulfonate, N-hydroxy-5-norbomene-2,3-dicarboxylmide p-toluenesulfonate, N-hydroxynaphthalimide triflate, and N-hydroxy-5-norbornene-2,3-dicarboximide perfluoro-1-butanesulfonate.

One or more nonionic photoacid generators can be present in the photopolymerizable composition in an amount of at least 0.05 weight % and up to and including 10 weight %, or typically at least 0.1 weight % and up to and including 10 weight %, based on the total weight of the all four (a) through (d) components.

(c) Electron Donor Photo Sensitizers

Useful electron donor photosensitizers should be soluble in the photocurable composition, free of functionalities that would substantially interfere with the cationic photocuring process, and capable of light absorption (sensitivity) within the range of wavelengths of at least 150 nm and up to and including 1000 nm.

Suitable electron donor photosensitizers initiate the chemical transformation of the onium salt (or other photoacid generator) in response to the photons absorbed from the irradiation. The electron donor photosensitizer should also be capable of reduce the photoacid generator after the electron donor photosensitizer has absorbed light (that is, photoinduced electron transfer). Thus, the electron donor photo sensitizer, upon absorption of photons from irradiation, is generally capable of donating an electron to the photoacid generator.

For uses of the photocurable compositions in which very rapid curing (such as the curing of thin applied films of the compositions) is desired, the electron donor photosensitizers can have an extinction coefficient of at least 1000 liter-mole$^{-1}$ cm$^{-1}$ and typically at least 50,000 liters-mole$^{-1}$ cm$^{-1}$ at the desired irradiation wavelength using the photocuring process.

For example, each of the electron donor photosensitizers generally has an oxidation potential of at least 0.4 V and up to and including 3 V vs. SCE (saturated calomel electrode), or more typically of at least 0.8 V and up to and including 2 V vs. SCE.

In general, many different classes of compounds can be used as electron donor photosensitizers for various reactants. Useful electron donor photosensitizers include but are not limited to, aromatics such as naphthalene, 1-methylnaphthalene, anthracene, 9,10-dimethoxyanthracene, benz[a]anthracene, pyrene, phenanthrene, benzo[c]phenanthrene, and fluoranthene.

Other useful electron donor photosensitizers that involve the triplet excited state are carbonyl compounds such as thioxanthones and xanthones. Ketones including aromatic ketones such as fluorenone, and coumarin dyes such as ketocoumarins such as those with strong electron donating moieties (such as dialkylamino) can also be used as electron donor photosensitizers. Other suitable electron donor photosensitizers are believed to include xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriarylmethanes, merocyanines, squarylium dyes, and pyridinium dyes.

It is also possible to use a mixture of electron donor photosensitizers that are chosen from the same or different classes of materials.

Various useful electron donor photosensitizers are available from various commercial sources and can be readily found for use in the present invention.

The one or more electron donor photosensitizers can be present in the photocurable composition in an amount of at least 0.0001 weight % and up to and including 5 weight %, and typically at least 0.001 weight % and up to and including 2 weight %, based on the total weight of components (a) through (d). In some embodiments, the electron donor photosensitizer is a pyrene, benzopyrene, perylene, or benzoperylene that is present in an amount of at least 0.05 weight % and up to and including 2 weight %, based on the total weight of components (a), (b), and (d).

(d) Metal Particles

Metal particles are present in the photocurable composition. Usually only one type of metal particles are used, but it is also possible to include mixtures of metal particles, from the same or different classes of metals, that do not interfere with each other. These metal particles generally have a net neutral charge.

Useful metal particles can be chosen from one or more classes of noble metals, semi-noble metals, Group IV metals, or combinations thereof. Useful noble metal particles include but are not limited to, particles of gold, silver, palladium, platinum, rhodium, iridium, rhenium, mercury, ruthenium, and osmium. Useful particles of semi-noble metals include but are not limited to, particles of iron, cobalt, nickel, copper, carbon, aluminum, zinc, and tungsten. Useful particles of Group IV metals include but are not limited to particles of tin, titanium, and germanium. The noble metal particles such as particles of gold, silver, palladium, and platinum are particularly useful, and the semi-noble particles of nickel and copper are also particularly useful. Tin particles are particularly useful in the Group IV metal class. In many embodiments, silver or copper particles are used in the photocurable composition as "seed" metal particles of electroless plating methods.

The metal particles useful in the present invention can be coated with surfactants, polymers, or carbon. The carbon used for coating metal particles can be amorphous, sp2 hybridized, or graphene-like in nature. Such carbon can be used to prevent aggregation of metal particles and provide improved dispersibility in the photocurable composition.

The metal particles can be dispersed in various organic solvents and can have improved dispersibility in the presence of the other essential components of the photocurable composition, such as multifunctional polymeric epoxy materials or in the presence of optional components such as multifunctional acrylate resins described below. The methods used to disperse the metal particles include but are not limited to, ball-milling, magnetic stirring, high speed homogenization, high pressure homogenization, and ultrasonication.

The metal particles can be present in the photopolymerizable composition as individual particles, but in many embodiments, the metal particles are present as agglomerations of two or more metal particles. Such metal particles can be present in any geometric shape including but not limited to, spheres, rods, prisms, cubes, cones, pyramids, wires, flakes, platelets, and combinations thereof, and they can be uniform or non-uniform in shapes and sizes. The average particle size of individual and agglomerated metal particles can vary from at least 0.01 µm and up to and including 25 µm, or more likely of at least 0.02 µm and up to and including 5 µm. Although the size of the metal particles is not particularly limited, optimal benefits can be achieved using metal particles as individual particles or agglomerates, having an average particle size of at least 0.02 µm and up to and including 10 µm. The particle size distribution is desirably narrow as defined as one in which greater than 50%, or typically at least 75%, of the particles have a particle size in the range of 0.2 to 2 times the average particle size. The average particle size (same as mean particle size) can be determined from the particle size distribution that can be determined using any suitable procedure and equipment including that available from Coulter or Horiba and the appropriate mathematical calculations used with that equipment.

Useful metal particles can be obtained from various commercial sources, or they can be derived from various metal salts or complexes and known reduction and isolation processes prior to use in the practice of this invention. Some commercial metal particles can be obtained for example from Novacentrix.

The metal particles are generally present in the photocurable composition in an amount of at least 0.1 weight % and up to and including 50 weight % or more typically at least 1 weight % and up to and including 30 weight %, based on the total weight of components (a) through (d).

(e) Free Radically Polymerizable Compounds

The photocurable compositions can also contain one or more free-radically polymerizable compounds to provide free-radically polymerizable functionality, including ethylenically unsaturated polymerizable monomers, oligomers, or polymers such as mono-functional or multi-functional acrylates (also includes methacrylates). Such free-radically polymerizable compounds comprise at least one ethylenically unsaturated polymerizable bond and they can comprise two or more of these unsaturated moieties that are capable of undergoing addition (or free radical) polymerization. Such free radically polymerizable materials include mono-, di-, or poly-acrylates and methacrylates including but not limited to, methyl acrylate, methyl methacrylate, ethyl acrylate, isopropyl methacrylate, n-hexyl acrylate, stearyl acrylate, allyl acrylate, glycerol diacrylate, glycerol triacrylate, ethylene glycol diacrylate, diethylene glycol diacrylate, triethylene glycol dimethacrylate, 1,3-propanediol diacrylate, 1,3-propanediol dimethacrylate, 1,4-butanediol diacrylate, 1,6-hexanediol diacrylate, neopentyl glycol diacrylate, neopentyl glycol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, dipentaetrythritol hexaacrylate, sorbitol hexaacrylate, bis[1-(2-acryloxy)]-p-ethoxyphenyldimethylmethane, bis[1-(3-acryloxy-2-hydroxy)]-p-propoxyphenyldimethylmethane, and tris-hydroxyethyl-isocyanurate trimethacrylate; the bis-acrylates and bis-methacrylates of polyethylene glycols having a molecular weight of from 200 to and including 500, co-polymerizable mixtures of acrylate monomers such as those described in U.S. Pat. No. 4,652,274 (Boettcher et al.) and acrylate oligomers such as those described in U.S. Pat. No. 4,642,126 (Zader et al.); and vinyl compounds such as styrene and styrene derivatives, diallyl phthalate, divinyl succinate, divinyl adipate, and divinyl phthalate. Mixtures of two or more of these free radically polymerizable materials can be used if desired.

Such materials can be purchased from a number of commercial sources or prepared using known synthetic methods and starting materials.

Although the amount of the one or more free radically polymerizable materials is not particularly limited, they can be present in the photopolymerizable compositions in an amount of at least 20 weight % and up to and including 75 weight % or typically of at least 40 weight % and up to and including 60 weight %, based on the total weight of all components of the photocurable composition and can be optimized based on the desired properties of composition solubility and mechanical strength of the photocured composition.

(f) Free Radical Photoinitiators

If the (e) component is present, one or more free radical photoinitiators are also present in the photocurable compositions to generate free radicals in the presence of the free-radically polymerizable compounds. Such free radical photoinitiators include any compound that is capable of generating free radicals upon exposure to photopolymerizing radiation used in the practice of this invention such as ultraviolet or visible radiation. For example, free radical photoinitiators can be selected from triazine compounds, thioxantone compounds, benzoin compounds, carbazole compounds, diketone compounds, sulfonium borate compounds, diazo compounds, and biimidazole compounds, and others that would be readily apparent to one skilled in the art. Mixtures of such compounds can be selected from the same or different classes.

Also useful are benzophenone compounds such as benzophenone, benzoyl benzoate, methyl benzoyl benzoate, 4-phenyl benzophenone, hydroxyl benzophenone, acrylated benzophenone, 4,4'-bis(dimethylamino)benzophenone and 4,4'-bis(diethylamino)benzophenone, anthraquinone compounds, and acetophenone compounds such as 2,2'-diethoxyacetophenone, 2,2'-dibutoxyacetophenone, 2-hydroxy-2-methylpropiophenone, p-t-butyltrichloroacetophenone, p-t-butyldichloroacetophenone, benzophenone, 4-chloroacetophenone, 4,4'-dimethylaminobenzophenone, 4,4'-dichlorobenzophenone, 3,3'-dimethyl-2-methoxybenzophenone, 2,2'-dichloro-4-phenoxyacetophenone, 2-methyl-1-(4-(methylthio)phenyl)-2-morpholinopropan-1-one, and 2-benzyl-2-dimethylamino-1-(4-morpholinophenyl)-butane-1-one. Further useful compounds of this type are described for example in U.S. Pat. No. 7,875,416 (Park et al.).

Many of such free radical photoinitiators can be obtained from various commercial sources.

Such free radical photoinitiators are generally present in the photocurable composition in an amount of at least 0.1 weight % and up to and including 10 weight %, or typically at least 1 weight % and up to and including 5 weight %, based on the total weight of all components of the photocurable composition.

It is also possible include conductive nano-oxides and conductive nano-carbon materials such as nano-tubes, nano-graphene, and bucky balls. Conductive nano-oxides include but are not limited to, indium tin oxide, antimony oxide, antimony tin oxides, indium oxide, zinc oxide, zinc aluminum oxide, and mixtures thereof.

It can be useful to include one or more hydroxy-containing materials, including polyols, in the photocurable composition as charge transfer agents to aid in the photopolymerization process. The term "polyol" refers to an organic compound having two or more primary or secondary aliphatic hydroxy groups in the molecule. Each hydroxy (or hydroxyl) group in a hydroxy-containing material is directly bonded to a non-aromatic carbon atom in the molecule. When used, the hydroxy-containing materials can be in liquid or solid form and have an organic nature. Any of the hydroxyl groups can be terminally situated, or pendant from a homopolymer or copolymer backbone.

Addition of vinyl ether compounds as chain transfer agents to the photocurable compositions can also be desirable to further increase photopolymerization rates or ensure desired physical properties in the final photocured patterned material. Examples of useful vinyl ether compounds include but are not limited to, Rapi-Cure™ DVE-3 (triethyleneglycol divinylether), Rapi-Cure™ HBVE (1,4-cyclohexane dimethanoldivinylether), and Rapi-Cure™ HBVE (butanediol monovinylether), all available from Ashland Inc.).

The photocurable compositions can also contain suitable adjuvants (or additives) such as accelerators, inhibitors, absorbers, stabilizers, pigments, dyes, UV absorbers, viscosity modifiers, flow improvers, surface tension depressants and wetting aids, antioxidants, surfactants, and other ingredients well known to those skilled in the art.

Photocurable compositions are generally prepared as patterned materials for coating, printing, or other means of application to the substrate of this invention by simply admixing, under "safe light" conditions within suitable inert organic solvents that do not react appreciably with any components incorporated therein. Examples of suitable inert solvents include but are not limited to, acetone, dichloromethane, isopropanol, Dowanol PM, 1-methoxy-2-propanol, ethylene glycol, and mixtures thereof. When one or more components to be used are in liquid form, those components can act as the "solvent" for the photocurable composition, or used in combination with one or more inert organic solvents. Solvent-free photocurable compositions can be prepared by simply dissolving, dispersing, and mixing the essential components (a) through (d) and any optional components with or without the use of mild heating to facilitate dissolution or dispersion.

When inert organic solvents are used, they can be present in an amount of at least 1 weight % and up to and including 70 weight % or at least 20 weight % and up to and including 50 weight %, based on the total weight of the components (a) through (d) described above.

Upon suitable photocuring or thermal curing conditions, the article described above can comprise a patterned material comprising an electrically-conductive metal and a photocured or thermally cured composition, all disposed in a patternwise fashion on the dried primer layer of the substrate. At least a portion of the pattern of patternable material comprises lines having an average line width of less than 15 µm. Such patterned material thus can comprise particles of gold, silver, copper, palladium, or platinum dispersed within the photocured or thermally cured composition that has been derived from the corresponding photocurable or thermally curable composition.

Methods for Making Patterns Including Electrically-Conductive Patterns

A first method is used to provide a primed article with a patterned material, including providing a transparent polymeric substrate that comprises a transparent polymer support (as described above) and a dried primer layer (as described above), and then providing a pattern of a patternable material (as described above) directly onto the dried primer layer. As noted above, this pattern can be provided by direct contact of the dried primer layer with a relief printing member (such as a flexographic printing member) as described herein, which relief printing member carries the patterned material on the upper surface of the relief image that is typically formed in an elastomeric material. Gravure printing and intaglio printing are other means for applying a pattern of a patternable material onto the dried primer layer.

Moreover, it is desirable that at least a portion of the pattern of patterned material so provided comprises lines having an average line width of less than 15 µm, and such portion of the patterned material will be present in what will eventually be the touch screen region of the primed article (as opposed to an electrode regions or BUS region). Such patterned material can comprise an electrically-conductive metal or electrically-conductive metal precursor as described above, and the patterned material can comprise a photocurable or thermally curable composition, either of which comprises an electrically-conductive metal or an electrically-conductive metal precursor.

It should also be understood especially from the description of particular manufacturing embodiments described below, that the same or different patterned material can be applied to opposing supporting sides of the substrate, particularly if the substrate comprises a dried primer layer on both supporting sides of the support. Such primed and patterned articles can be considered "duplex" since they have a dried primer layer and pattern material on both sides of the support (including transparent polymer supports).

In particularly desirable embodiments in which the patterned material comprises a photocurable or thermally curable composition, the patterned material is then subjected to curing conditions and apparatus, on one or both sides of the substrate.

For example, photocuring can be achieved by irradiating the patterned material with radiant energy such as ultraviolet light as described above. Desirable photocuring can be achieved using UV or visible irradiation having a wavelength of at least 184.5 nm to and including 700 nm and at intensity of at least 1 mJ/cm$^2$ and up to and including 1000 mJ/cm$^2$ or more typically of at least 1 mJ/cm$^2$ and up to and including 800 mJ/cm$^2$.

At least a portion of the resulting cured pattern of patterned material (for example, precursor electrically-conductive material) can comprise fine lines of cured material having an average line width of less than 15 µm in that portion. In many embodiments, the entire pattern is cured in this manner.

At least a portion, and generally all, of the cured pattern of precursor electrically-conductive material can be converted to a pattern of electrically-conductive material comprises electrically-conductive fine lines as described above. By "precursor electrically-conductive material" refers to a composition that can be treated chemically, physically, or electrically to render the material electrically-conductive. Some embodiments of such "precursor" materials are compositions comprising "seed" metals described below.

When the patterned material in such embodiments comprises an electrically-conductive metal or an electrically-conductive metal precursor, for example, wherein the electrically-conductive metal comprises seed metal particles, the seed metal particles in the pattern of patterned material on the substrate can be electrolessly metal plated using conditions and electroless plating reagents that are known in the art, some of which details are described below. Multiple patterns containing seed metal particles can be created in this manner especially when the transparent polymeric substrate containing the dried primer layer is a continuous web as illustrated below and shown in FIG. 1.

In such embodiments, a plurality of individual patterns of a photocurable or thermally curable composition are provided on a transparent polymeric substrate in the form of a continuous web, which photocurable or thermally curable composition is a precursor electrically-conductive material containing seed metal particles, applied directly on the dried primer layer in a plurality of individual portions of the continuous web. Such continuous web can have an integrated transmittance of at least 88% or at least 95%, and comprises the dried primer layer (as described above) on a transparent polymer support that can be a transparent polyester support (as described above).

In this manner, a plurality of precursor articles described herein can be prepared for use immediately after production or at a later time. For example, a plurality of precursor articles can be formed on a continuous web of the primed substrate of this invention that has been provided in roll form, and then is wound up in roll form containing first, second, and optional additional multiple cured patterns. Each of the plurality of individual patterns of photocurable or thermally curable compositions in the patterned material is cured as noted above to form a plurality of individual cured patterns in the plurality of individual portions on the continuous web, which individual cured patterns contain the seed metal particles.

Such plurality of individual cured patterns can then be electrolessly plated as described below immediately after curing or sometime later and optionally at a different location, using the same or different electroless plating baths and conditions.

The resulting product articles contain one or more electrically-conductive patterns on one or both sides of the substrate, which electrically-conductive patterns can comprise the fine lines having an average line width of less than 15 µm, and can be arranged in a touch region of an electrically-conductive article or display device. Particularly useful devices of this type comprise a transparent electrically-conductive film having an integrated transmittance of at least 88% and the dried primer layer of the substrate (as described above) is directly disposed on a transparent polymer support, such as a polyester support.

More details regarding large scale manufacturing and use of primed articles to provide electrically-conductive articles and devices are now considered.

A primed article of this invention can be used individually as a single element, or as a continuous web (for example, for roll-to-roll processes) having multiple portions of patterns of patterned materials directly disposed on the dried primer layer (on one or both supporting sides of the substrate). Such continuous web can processed to apply patterned material in coating stations and then advanced through exposure (curing) stations, or the exposure (curing) device can be passed over multiple patterns of patterned material of the continuous web. The same or different photocurable compositions can be used in the patterned materials (for example, printed) on both supporting sides of the substrate whether it is in the form of a single element or continuous web. In many embodiments, different conductive metal patterns are formed on opposing supporting sides of the substrate (or continuous web).

As noted above, the patterned material can be applied in a pattern-wise manner using any suitable means for application, but flexographic printing using flexographic printing members are particularly useful.

After application of the patterned material onto a substrate, any inert organic solvents can be removed by a drying or pre-baking procedure that does not adversely affect the remaining components or prematurely cause polymerization. Useful drying conditions can be as low as room temperature for as little as 5 seconds and up to and including several hours depending upon the manufacturing process. In most processes, such as roll-to-roll processes described below, the drying conditions can be at high enough temperatures to remove at least 90% of the inert organic solvent within at least 1 second.

Any applied pattern of the patterned material can comprise a grid of lines (or other shapes including circles or an irregular network) having an average thickness (or width) of at least 0.2 μm and up to and including 20 μm, or typically of at least 2 μm and up to and including 15 μm, and the optimal dry thickness (or width) can be tailored for the intended use of the resulting uniform photocured layer, which generally has about the same dry thickness (or width) as the grid lines of the non-photocured patterned material.

Thus, the present invention provides articles comprising a substrate and patterns of the patterned material, wherein such articles can be considered "precursor" articles, meaning that they are the first articles produced in methods used to provide conductive articles.

In some embodiments, the same or different photocurable or thermally curable composition can be applied in a suitable manner on both supporting sides of the substrate to form various features for each curable pattern on "duplex" or dual-sided precursor articles, and the multiple cured patterns can have the same or different seed metal particles that are gold particles, silver particles, copper particles, palladium particles, or platinum particles.

In many embodiments, a pattern of the photocurable or thermally curable composition is applied on one or both (opposing) supporting sides of the substrate (for example as a roll-to-roll continuous web) using a relief printing member such as elastomeric printing members derived from flexographic printing plate precursors, many of which are known in the art and some are commercially available, for example as the Cyrel® Flexographic Photopolymer Plates from DuPont and the Flexcel SR and NX Flexographic plates from Eastman Kodak Company.

Particularly useful relief printing members are derived from flexographic printing plate precursors and flexographic printing sleeve precursors, each of which can be appropriately imaged (and processed if needed) to provide the relief images for "printing" or applying a suitable pattern.

For example, useful flexographic printing member precursors are described in U.S. Pat. No. 7,799,504 (Zwadlo et al.) and U.S. Pat. No. 8,142,987 (Ali et al.) and U.S. Patent Application Publication 2012/0237871 (Zwadlo). The relief image layer can be different for providing different patterns of patterned materials to the same or opposing supporting sides of the substrate. In other embodiments, the elastomeric relief element is provided from a direct (or ablation) laser-engraveable elastomer relief element precursor, with or without integral masks, as described for example in U.S. Pat. No. 5,719,009 (Fan), U.S. Pat. No. 5,798,202 (Cushner et al.), U.S. Pat. No. 5,804,353 (Cushner et al.), U.S. Pat. No. 6,090,529 (Gelbart), U.S. Pat. No. 6,159,659 (Gelbart), U.S. Pat. No. 6,511,784 (Hiller et al.), U.S. Pat. No. 7,811,744 (Figov), U.S. Pat. No. 7,947,426 (Figov et al.), U.S. Pat. No. 8,114,572 (Landry-Coltrain et al.), U.S. Pat. No. 8,153,347 (Veres et al.), U.S. Pat. No. 8,187,793 (Regan et al.), and U.S. Patent Application Publications 2002/0136969 (Hiller et al.), 2003/0129530 (Leinenback et al.), 2003/0136285 (Telser et al.), 2003/0180636 (Kanga et al.), and 2012/0240802 (Landry-Coltrain et al.).

When the noted elastomeric relief elements are used in the present invention, the patterned material can be applied in a suitable manner to the uppermost relief surface (raised surface) in the relief printing member. Application can be accomplished using several suitable means and it is desirable that as little as possible is coated onto the sides (slopes) or recesses of the relief depressions. Thus, it is desirable that as much as possible of the patterned material is applied only to the uppermost relief surface. Anilox roller systems or other roller application systems, especially low volume Anilox rollers, below 2.5 billion cubic micrometers per square inch (6.35 billion cubic micrometers per square centimeter) and associated skive knives can be used. Optimum metering of the patterned material onto the uppermost relief surface can be achieved by controlling viscosity or thickness, or choosing an appropriate application means.

The patterned material can be fed from an Anilox or other roller inking system in a measured amount for each printed pattern. In one embodiment, a first roller can be used to transfer the patterned material from an "ink" pan or a metering system to a meter roller or Anilox roller. The patterned material is generally metered to a uniform thickness when it is transferred from the Anilox roller to a printing plate cylinder. When the substrate (for example, continuous web) is moved through the roll-to-roll handling system from the printing plate cylinder to an impression cylinder, the impression cylinder applies pressure to the printing plate cylinder that transfers an image from a relief printing member to the substrate.

After the patterned material has been applied to the uppermost relief surface (or raised surface) of the relief printing member, it can be useful to remove at least 25 weight % of any inert organic solvents included in the patterned material to form a more viscous deposit on the uppermost relief surface of the relief image. This removal of inert organic solvents can be achieved in any manner, for example using jets of hot air, evaporation at room temperature, or heating in an oven at an elevated temperature, or other means known in the art for removing a solvent.

Once the one or more patterns are disposed on the dried primer layer of the substrate (for example, as a continuous web), the patterned material in the resulting precursor article can be cured for example by irradiation with suitable radiation as described above from a suitable source such as a fluorescent lamp or LED to provide one or more cured patterns on the substrate. The irradiation system used to generate suitable radiation can consist of one or more ultraviolet lamps for example in the form of 1 to 50 discharge lamps, for example, xenon, metallic halide, metallic arc (such as a low, medium or high pressure mercury vapor discharge lamps having the desired operating pressure from a few millimeters to about 10 atmospheres). The lamps can include envelopes capable of transmitting light of a wavelength of at least 190 nm and up to and including 700 nm or typically at least 240 nm and up to and including 450 nm. Typical lamps that can be employed for providing ultraviolet radiation are, for example, medium pressure mercury arcs, such as the GE H3T7 arc and a Hanovia 450 W arc lamp. Photocuring can be carried out using a combination of various lamps, some of or all of which can operate in an inert atmosphere. When using UV lamps, the irradiation flux impinging upon the substrate (or applied layer or pattern) can be at least 0.01 watts/inch$^2$ (0.00155 watts/cm$^2$) to effect sufficient rapid photocuring of the applied patterned material within 1 to 20 seconds in a continuous manner, for example in a roll-to-roll operation.

An LED irradiation device to be used in the photocuring station can have an emission peak wavelength of 350 nm or more. The LED device can include two or more types of elements having different emission peak wavelengths greater than or equal to 350 nm. A commercial example of an LED device that has an emission peak wavelength of 350 nm or more and has an ultraviolet light-emitting diode (UV-LED), is NCCU-033 that is available from Nichia Corporation.

The result of such irradiation of a precursor article is an intermediate article comprising the substrate (for example, individual sheets or a continuous web) and having thereon one or more cured patterns (for example, each containing suitable seed metal particles) on one or both supporting sides of the substrate. In some embodiments of the precursor articles, the multiple curable patterns and cured patterns can be formed using the same photocurable or thermally curable composition. Such photocurable composition can comprise a free radical curable composition, an acid catalyzed composition, or both a free radical curable composition and an acid catalyzed curable composition, all as described above.

The resulting intermediate articles can be used in this form for some applications, but in most embodiments, they are further processed to incorporate an electrically-conductive metal on the one or more (multiple) cured patterns, each of which can include the seed metal particles for electroless metal plating procedures. For example, the seed metal particles can be the metal particles identified above as component (d), for example gold particles, silver particles, copper particles, palladium particles, or platinum particles, or mixtures thereof.

One useful method according to the present invention uses multiple flexographic printing plates (for example, prepared as described above) in a stack in a printing station wherein each stack has its own printing plate cylinder so that each flexographic printing plate is used to print individual portions of patterned materials on a substrate, such as using the stack of printing plates to print patterns of patterned material in multiple portions on one or both supporting sides of a substrate web (such a polymeric continuous web). The same or different photopolymerizable composition can be "printed" or applied to these multiple portions on the substrate using the multiple flexographic printing plates.

In other embodiments, a central impression cylinder can be used with a single impression cylinder mounted on a printing press frame. As the substrate enters the printing press frame, it is brought into contact with the impression cylinder and the appropriate pattern is printed with the patterned material such as a photocurable composition. Alternatively, an in-line flexographic printing process can be utilized in which the printing stations are arranged in a horizontal line and are driven by a common line shaft. The printing stations can be coupled to exposure stations, cutting stations, folders, and other post-processing equipment. A skilled worker could readily determine other useful configurations of equipment and stations using information that is available in the art. For example, an in-the-round imaging process is described in WO 2013/063084 (Jin et al.).

The intermediate article prepared at this stage containing one or more cured patterns (or portions) containing seed metal particles can be immediately immersed in an aqueous-based electroless metal plating bath or solution, or the intermediate article can be stored with just the cured patterns for use at a later time.

The intermediate article can be contacted with an electroless plating metal that is the same as or different from the corresponding seed metal particles described above. In most embodiments, the electroless plating metal is a different metal from the corresponding seed metal particles.

Any metal that will likely electrolessly "plate" on the cured patterns of corresponding seed metal particles can be used at this point, but in most embodiments, the electroless plating metal can be for example copper(II), silver(I), gold (IV), palladium(II), platinum(II), nickel(II), chromium(II), and combinations thereof. Copper(II), silver(I), and nickel (II) are particularly useful electroless plating metals.

The one or more electroless plating metals can be present in the aqueous-based electroless plating bath or solution in an amount of at least 0.01 weight % and up to and including 20 weight % based on total solution weight.

Electroless plating can be carried out using known temperature and time conditions, as such conditions are well known in various textbooks and scientific literature. It is also known to include various additives such as metal complexing agents or stabilizing agents in the aqueous-based electroless plating solutions. Variations in time and temperature can be used to change the metal electroless plating thickness or the metal electroless plating deposition rate.

A useful aqueous-based electroless plating solution or bath is an electroless copper(II) plating bath that contains formaldehyde as a reducing agent. Ethylenediaminetetraacetic acid (EDTA) or salts thereof can be present as a copper complexing agent. For example, copper electroless plating can be carried out at room temperature for several seconds and up to several hours depending upon the desired deposition rate and plating rate and plating metal thickness.

Other useful aqueous-based electroless plating solutions or baths comprise silver(I) with EDTA and sodium tartrate, silver(I) with ammonia and glucose, copper(II) with EDTA and dimethylamineborane, copper(II) with citrate and hypophosphite, nickel(II) with lactic acid, acetic acid, and a hypophosphite, and other industry standard aqueous-based electroless baths or solutions such as those described by Mallory et al. in *Electroless Plating: Fundamentals and Applications* 1990.

After the electroless plating procedure to provide a conductive metal pattern on one or more cured portions on one or opposing supportive sides of the substrate (such as a continuous web), the resulting product article is removed from the aqueous-based electroless plating bath or solution and can again be washed using distilled water or deionized water or another aqueous-based solution to remove any residual electroless plating chemistry. At this point, the electrolessly plated metal is generally stable and can be used for its intended purpose.

In some embodiments, the resulting product article can be rinsed or cleaned with water at room temperature as described for example in [0048] of WO 2013/063183 (Petcavich), or with deionized water at a temperature of less than 70° C. as described in [0027] of WO 2013/169345 (Ramakrishnan et al.).

Thus, this method provides a product article comprising a substrate comprising a dried primer layer as described above and having disposed thereon electrically-conductive patterns comprising at least some fine lines having an average line width of less than 15 µm on one or both supporting sides of the substrate.

To change the surface of the electroless plated metal for visual or durability reasons, it is possible that a variety of post-treatments can be employed including surface plating of still at least another (third or more) metal such as nickel, palladium, or silver on the electrolessly plated metal (this procedure is sometimes known as "capping"), or the creation of a metal oxide, metal sulfide, or a metal selenide layer that is adequate to change the surface color and scattering properties without reducing the conductivity of the electrolessly plated (second) metal. Depending upon the metals used in the various capping procedures of the method, it may be desirable to treat the electrolessly plated metal with another seed metal catalyst in an aqueous-based seed metal catalyst solution to facilitate deposition of additional metals.

In addition, multiple treatments with aqueous-based electroless metal plating solutions can be carried out in sequence, using the same or different conditions. Sequential washing or rinsing steps can be also carried out where appropriate at room temperature or a temperature less than 70° C.

Further, the electroless plating procedures can be carried out multiple times, in sequence, using the same or different electroless plating metal and the same or different electroless plating conditions.

Thus, in some embodiments of the method for providing a product article of this invention, the method comprises:

providing a continuous web of a transparent polymeric substrate of any of the embodiments described above, forming a photocurable or thermally curable pattern on at least a first portion of the continuous web (directly on the dried primer layer) using a photocurable or thermally curable composition as described above, for example using a flexographic printing member, curing the photocurable or thermally curable pattern in a suitable manner (as described above) to form a photocured or thermally cured pattern on the first portion, and electrolessly plating the photocured r thermally cured pattern on the first portion with an electrically conductive metal, using electroless plating procedures described above.

Embodiments of this method can be carried out on a single supporting side of the substrate, or on opposing supporting sides of the substrate to provide the same or different electrically-conductive patterns.

In still other embodiments, a method of this invention can be used to provide a plurality of electrically-conductive metal patterns, comprises:

providing a continuous web according to this invention comprising multiple photocured patterns in respective portions, each photocured pattern being provided by irradiation of a photocurable or thermally curable composition as described above, treating the continuous web comprising multiple photocured or thermally cured patterns with an electroless metal plating solution to provide multiple electrolessly plated metal patterns on the continuous web in the respective portions, and optionally, further treating the multiple electrolessly plated metal patterns with a capping metal to provide multiple capped electrically conductive patterns on the continuous web.

This method can be taken further by:

forming individual electrically-conductive articles from the continuous web comprising multiple capped electrically-conductive patterns, and assembling the individual electrically-conductive articles into the same or different individual devices such as display devices having touch screen displays.

Such method embodiments can be carried out on both supporting sides of the substrates using the same or different photocurable or thermally curable compositions.

Useful product articles prepared according to the present invention can be formulated particularly into capacitive touch screen sensors that comprise suitable conductive grid lines, electrodes (or BUS regions), electrical leads, and electrical connectors. For example, the electrodes and tail can be formed by printing the pattern materials and electrolessly plating the printed patterns.

Some details of useful methods and apparatus for carrying out the present invention are described for example in WO 2013/063183 (Petcavich), WO 2013/169345 (Ramakrishnan et al.). Other details of a useful manufacturing system for preparing conductive articles especially in a roll-to-roll manner are provided in PCT/US/062366 (filed Oct. 29, 2012 by Petcavich and Jin), the disclosure of which is incorporated herein by reference.

An additional system of equipment and step features that can be used in carrying out the present invention is described in U.S. Ser. No. 14/146,867 (filed Jan. 3, 2014 by Shifley), which is incorporated herein by reference for any details that are pertinent to the present invention.

Referring to FIG. 1, it shows a schematic side view of a flexographic printing system 100 that can be used in embodiments of the method of the present invention for roll-to-roll printing a photocurable or thermally curable composition on both (opposing) supportive sides of a substrate 150 that can comprise a dried primer layer disposed directly on a support. Substrate 150 is fed as a continuous web from supply roll 102 to take-up roll 104 through flexographic printing system 100. Substrate 150 has a first supporting side 151 and a second supporting side 152.

Flexographic printing system 100 includes two print modules 120 and 140 that are configured to print on the first supporting side 151 of substrate 150, as well as two print modules 110 and 130 that are configured to print on the second (opposing) supporting side 152 of substrate 150. The continuous web of substrate 150 travels overall in roll-to-roll direction 105 (left to right in FIG. 1). However, various rollers 106 and 107 are used to locally change the direction of the continuous web of the substrate as needed for adjusting web tension, providing a buffer, and reversing a supporting side for printing. In particular, print module 120 roller 107 serves to reverse the local direction of the continuous web of substrate 150 so that it is moving substantially in a right-to-left direction.

Each of the print modules 110, 120, 130, 140 can include some similar apparatus components including a respective plate cylinder 111, 121, 131, 141, on which is mounted a respective flexographic printing plate 112, 122, 132, 142, respectively. Each flexographic printing member (flexographic printing plate) 112, 122, 132, 142 has raised features 113 defining an image pattern to be printed on the substrate 150. Each print module 110, 120, 130, 140 also includes a respective impression cylinder 114, 124, 134, 144 that is configured to force a supporting side of the substrate 150 into contact with the corresponding flexographic printing member 112, 122, 132, 142.

With reference to the rotation directions of the different components of the print modules 110, 120, 130, 140, it is noted that the impression cylinders 124 and 144 of print modules 120 and 140 (for printing on first side 151 of substrate 150) rotate counter-clockwise in the view shown in FIG. 1, while the impression cylinders 114 and 134 of print modules 110 and 130 (for printing on second side 152 of substrate 150) rotate clockwise in this view.

Each print module 110, 120, 130, 140 also includes a respective Anilox roller 115, 125, 135, 145 for providing the patterned material to the corresponding flexographic printing member (flexographic printing plate) 112, 122, 132, 142. As is well known in the printing industry, an Anilox roller is a hard cylinder, usually constructed of a steel or aluminum core, having an outer surface containing millions of very fine dimples, known as cells. Transfer of the patterned material would be readily possible using the Anilox roller. In some embodiments, some or all of the print modules 110, 120, 130, 140 also include respective UV curing stations 116, 126, 136, 146 for curing the printed patternable material onto substrate 150.

Some embodiments of product articles and devices that can be prepared by embodiments of the present invention are shown in FIGS. 2-5.

Figure 2:
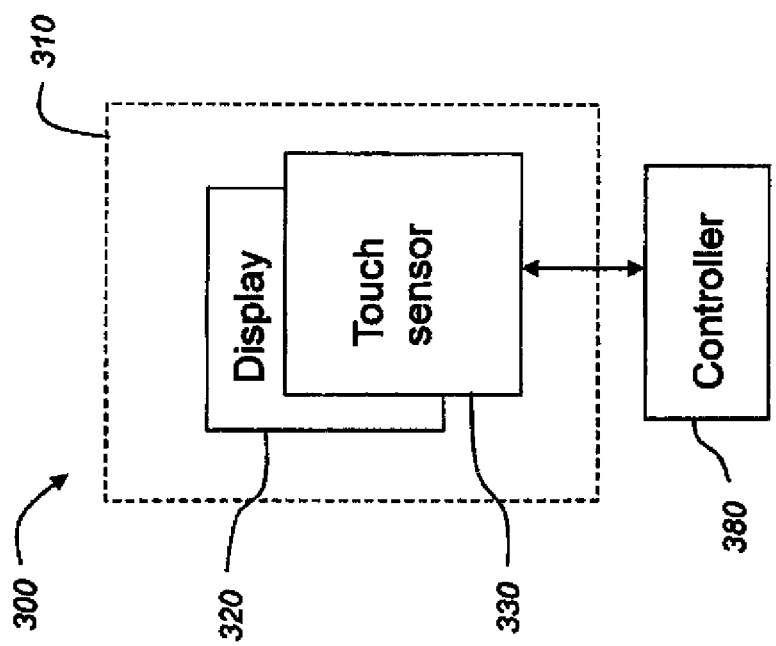
FIG. 2 is a high-level system diagram for an apparatus (device) comprising a touch screen with a touch sensor that can be prepared (printed) using the present invention.

FIG. 2 shows a high-level system diagram for an apparatus (or device) 300 having a touch screen 310 including a display device 320 and a touch sensor 330 that overlays at least a portion of a viewable area of display device 320. Touch sensor 330 senses touch and conveys electrical signals (related to capacitance values for example) corresponding to the sensed touch to a controller 380. Touch sensor 330 is an example of an article that can be printed on both supporting sides by the flexographic printing system 100 including print modules that incorporate embodiments of flexographic printing (inking) systems described above.

Figure 3:
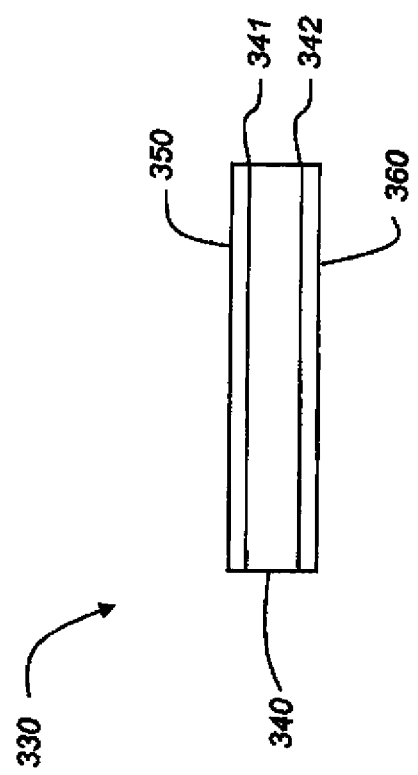
FIG. 3 is a side view of the touch sensor of FIG. 2.

FIG. 3 shows a schematic side view of a touch sensor 330. Transparent substrate 340 of the present invention, for example a transparent polyester such as transparent poly (ethylene terephthalate), has a first conductive pattern 350 printed on a first supporting side 341, and a second conductive pattern 360 printed on a second (opposing) supporting side 342. The length and width of the transparent substrate 340, which is cut from the take-up roll 104 (FIG. 1), is not larger than the flexographic printing plates (or flexographic printing members) 112, 122, 132, 142 of flexographic printing system 100 (FIG. 1), but it could be smaller than the flexographic printing plates (or flexographic printing members) 112, 122, 132, 142. Optionally, the first conductive pattern 350 and the second conductive pattern 360 can be plated using a plating process for improved electrical conductivity after flexographic printing and curing of the patterns or patterned material. A patterned material can be used to provide the noted electrically-conductive patterns 350 and 360 according to the method of this invention.

Figure 4:
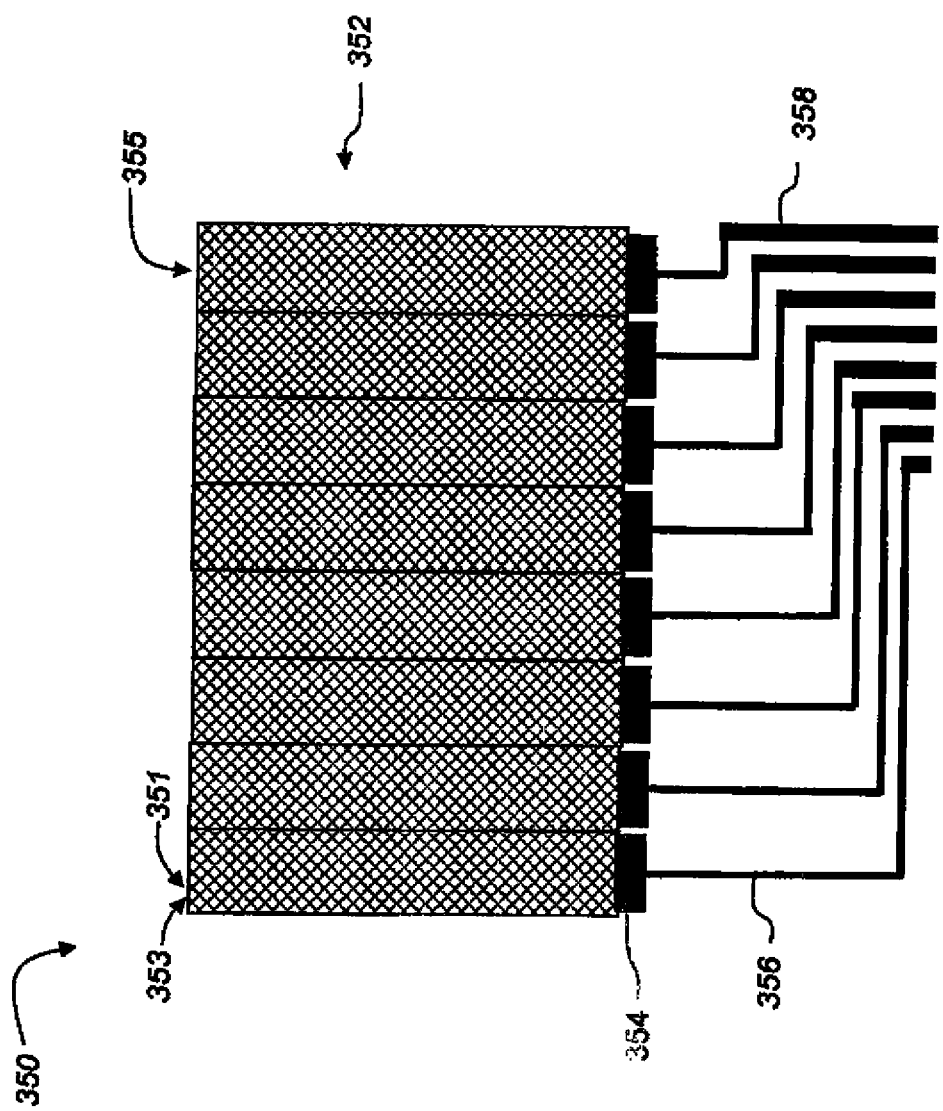
FIG. 4 is a top view of a conductive metal pattern that has been formed on a first supporting side of a substrate in the touch sensor of FIG. 3.

FIG. 4 shows an example of electrically-conductive pattern 350 that can be printed on first supporting side 341 (FIG. 3) of substrate 340 (FIG. 3) using one or more print modules such as print modules 120 and 140 of flexographic printing system (FIG. 1). Electrically-conductive pattern 350 includes a grid 352 including grid columns 355 of intersecting fine lines 351 and 353 that are connected to an array of channel pads 354. Interconnect lines 356 connect the channel pads 354 to the connector pads 358 that are connected to controller 380 (FIG. 2). Electrically-conductive pattern 350 can be printed by a single print module 120 in some embodiments. However, because the optimal print conditions for fine lines 351 and 353 (for example, having line widths on the order of 4 to 8 µm) are typically different than for printing the wider channel pads 354, connector pads 358, and interconnect lines 356, it can be advantageous to use one print module 120 for printing the fine lines 351 and 353 and a second print module 140 for printing the wider features. Furthermore, for clean intersections of fine lines 351 and 353 it can be further advantageous to print and cure one set of fine lines 351 using one print module 120, and to print and cure the second set of fine lines 353 using a second print module 140, and to print the wider features using a third print module (not shown in FIG. 1) configured similarly to print modules 120 and 140.

Figure 5:
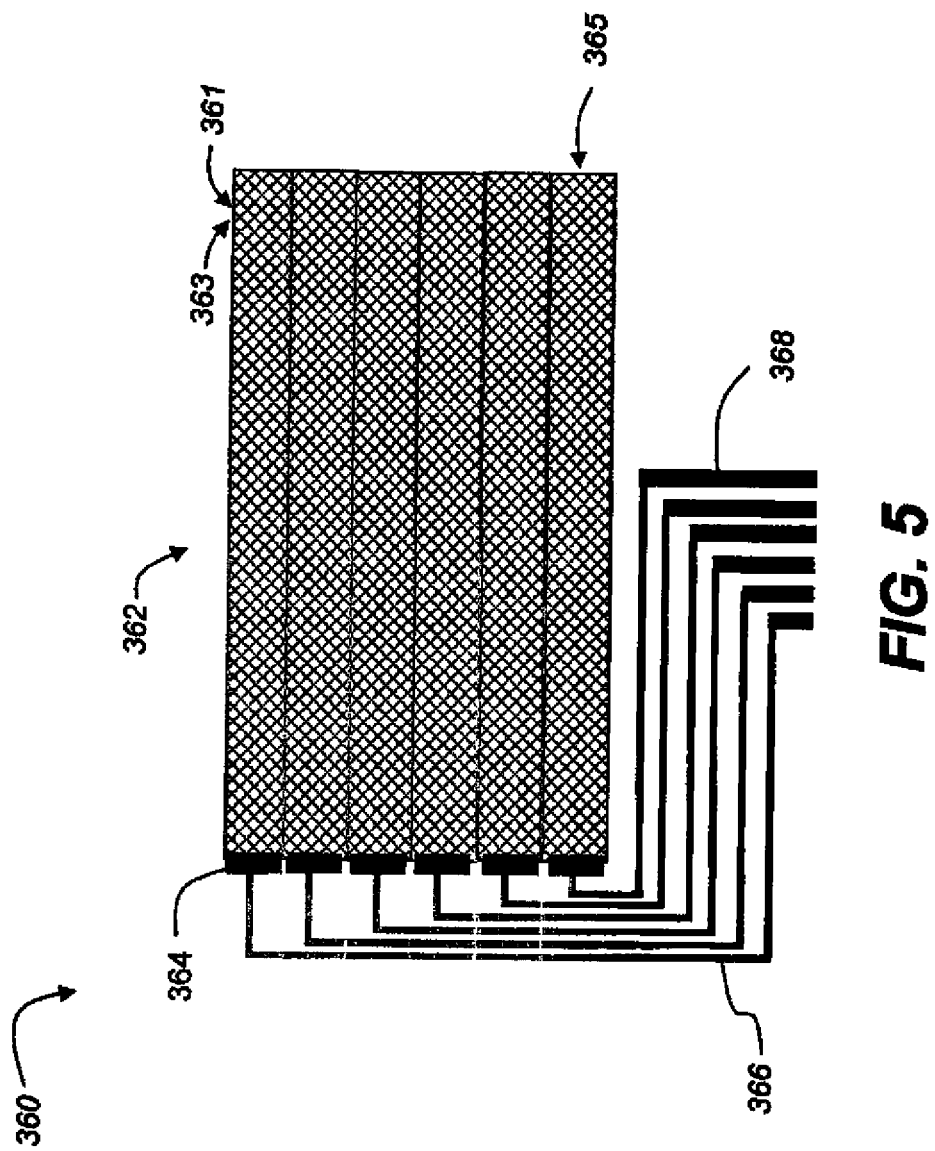
FIG. 5 is a top view of a conductive metal pattern that has been printed on a second (opposing) side of the substrate in the touch sensor of FIG. 3.

FIG. 5 shows an example of electrically-conductive pattern 360 that can be printed on second supporting side 342 (FIG. 3) of substrate 340 (FIG. 3) using one or more print modules such as print modules 110 and 130 of flexographic printing system 100 (FIG. 1). Electrically-conductive pattern 360 includes a grid 362 including grid rows 365 of intersecting fine lines 361 and 363 that are connected to an array of channel pads 364. Interconnect lines 366 connect the channel pads 364 to the connector pads 368 that are connected to controller 380 (FIG. 2). In some embodiments, electrically-conductive pattern 360 can be printed by a single print module 110 (FIG. 1). However, because the optimal print conditions for fine lines 361 and 363 (for example, having line widths on the order of 4 to 8 µm) are typically different than for the wider channel pads 364, connector pads 368, and interconnect lines 366, it can be advantageous to use one print module 110 (FIG. 1) for printing the fine lines 361 and 363 and a second print module 130 (FIG. 1) for printing the wider features. Furthermore, for clean intersections of fine lines 361 and 363 it can be further advantageous to print and cure one set of fine lines 361 using one print module 110 (FIG. 1), and to print and cure the second set of fine lines 363 using a second print module 130 (FIG. 1), and to print the wider features using a third print module (not shown in FIG. 1) configured similarly to print modules 110 and 130 (FIG. 1).

Alternatively, in some embodiments electrically-conductive pattern 350 (FIG. 4) can be printed using one or more print modules configured like print modules 110 and 130 (FIG. 1), and electrically-conductive pattern 360 (FIG. 5) can be printed using one or more print modules configured like print modules 120 and 140 (FIG. 1).

With reference to FIGS. 2-5, in operation of touch screen 310, controller 380 can sequentially electrically drive grid columns 355 via connector pads 358 and can sequentially sense electrical signals on grid rows 365 via connector pads 368. In other embodiments, the driving and sensing roles of the grid columns 355 and the grid rows 365 can be reversed.

The present invention provides at least the following embodiments and combinations thereof, but other combinations of features are considered to be within the present invention as a skilled artisan would appreciate from the teaching of this disclosure:

1. A composition comprising a mixture of a first polymer latex and a second polymer latex, wherein the first polymer latex comprises a first polymer and a first surfactant such that a dried coating of the first polymer latex has a surface polarity of at least 50%, and wherein the second polymer latex comprises a second polymer and a second surfactant such that a dried coating of the second polymer latex has a surface polarity of less than or equal to 27%, and wherein a dried coating of the composition has a surface polarity of at least 15% and up to and including 50%.

2. The composition of embodiment 1, wherein at least one of the first polymer and the second polymer comprises a vinyl polymer comprising recurring units derived at least from glycidyl (meth)acrylate.

3. The composition of embodiment 1 or 2, wherein each of the first polymer latex and the second polymer latex comprises a vinyl polymer independently comprising at least 75 weight % and up to and including 90 weight % of recurring units derived from glycidyl (meth)acrylate, based on the total weight of the vinyl polymer.

4. The composition of embodiment 3, wherein at least one of the first polymer latex and the second polymer latex comprises a vinyl polymer further comprising recurring units derived from an alkyl (meth)acrylate having an ester alkyl group having at least 2 carbon atoms.

5. The composition of embodiment 4, wherein at least one of the first polymer and the second polymer is crosslinked.

6. The composition of any of embodiments 1 to 5, wherein the first polymer and the second polymer independently have glass transition temperatures of at least 25° C.

7. The composition of any of embodiments 1 to 6, wherein the weight ratio of the first polymer latex to the second polymer latex in a dried primer layer formed therefrom is from 1:3 and to and including 3:1.

8. The composition of any of embodiments 1 to 7, wherein the first surfactant is an alkyl sulfonate sodium salt wherein the alkyl group has at least 10 carbon atoms, and the second surfactant is an alkyl phenol sulfate ammonium salt having at least 3 ethylene oxide units.

9. The composition of any of embodiments 1 to 8, wherein the first surfactant is a sodium α-olefin ($C_{14}$-$C_{16}$) sulfonate, and the second surfactant is an ammonium salt of a sulfated polyethoxy nonylphenol.

10. The composition of any of embodiments 1 to 9, wherein the first surfactant is a compound represented by R—$CH_2$—CH═CH—$CH_2$—S(═O)$_2$O$^-$Na$^+$ wherein R is a $C_{10}$, $C_{11}$, or $C_{12}$ hydrocarbon group, or mixtures of such compounds with different R groups that are any of $C_{10}$ to $C_{12}$ hydrocarbons groups; and the second surfactant is represented by R'-phenyl-(O—$CH_2CH_2$)$_n$—S(═O)O$_2^-$NH$_4^+$ wherein R' is a $C_8$ to $C_{12}$ hydrocarbon group, and n is 3 to 10.

11. The composition of any of embodiments 1 to 10, wherein the first surfactant is present in a dried primer layer formed therefrom in an amount of at least 1 weight % and up to and including 3 weight %, and the second surfactant is present in the dried primer layer in an amount of at least 0.35 weight % and up to and including 1.1 weight %, both based on the total dried primer layer weight.

12. The composition of any of embodiments 1 to 11, wherein the total amount of the first and second surfactants in a dried primer layer formed therefrom is up to and including 3.35 weight %, based on the total dried primer layer weight.

13. A substrate comprising a support and a dried primer layer disposed on at least one supporting surface of the support, the dried primer layer formed from the composition of any of embodiments 1 to 12 comprising a mixture of the first and second polymer latexes described above.

14. The substrate of embodiment 13 that has an integrated transmittance of at least 88%.

15. The substrate of embodiment 13 or 14 comprising a transparent polymeric support and having the dried primer layer disposed directly thereon.

16. The substrate of any of embodiments 13 to 15, wherein the dried primer layer has an average thickness of at least 0.05 μm and up to and including 0.4 μm.

17. The substrate of any of embodiments 13 to 16, comprising a poly(ethylene terephthalate) or poly(ethylene naphthalate) support.

18. The substrate of any of embodiments 13 to 17 that is a transparent polymeric substrate comprising a transparent polyester support and the dried primer layer disposed directly on at least one supporting surface of the transparent polyester support, wherein:

(i) the transparent polymeric substrate has an integrated transmittance of at least 88%;

(ii) the dried primer layer has an average thickness of at least 0.05 μm and up to and including 0.2 μm, and comprises a mixture of:

a first polymer latex comprising a first polymer and a first surfactant, wherein the first polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total first polymer weight, which first polymer has a glass transition temperature of at least 25° C. and up to and including 75° C., and the first surfactant is a sodium α-olefin ($C_{14}$-$C_{16}$) sulfonate;

a second polymer latex comprising a second polymer and a second surfactant that is different from the first surfactant, wherein the second polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total second polymer weight, which second polymer has a glass transition temperature of at least 25° C. and up to and including 75° C., and the second surfactant is an ammonium salt of a sulfated polyethoxy nonylphenol;

(iii) the dried primer layer has a surface polarity of at least 28% and up to and including 50%;

(iv) the weight ratio of the first polymer latex to the second polymer latex in the dried primer layer is from 1:1 and to and including 2.5:1;

(v) the first surfactant is present in the dried primer layer in an amount of at least 1 weight % and up to and including 3 weight %, based on total dried primer weight;

(vi) the second surfactant is present in the dried primer layer in an amount of at least 0.35 weight % and up to and including 1.1 weight %, based on the total dried primer layer; and (vii) the total amount of the first and second surfactants in the dried primer layer is less than 3.35 weight %, based on the total dried primer layer weight.

19. An article comprising a substrate of any of embodiments 13 to 18 comprising a patterned material comprising lines having an average line width of less than 15 µm, which patterned material is disposed directly on the dried primer layer.

20. The article of embodiment 20 that has an integrated transmittance of at least 88%.

21. The article of embodiment 19 or 20 comprising a transparent polymeric support and the dried primer layer disposed directly thereon.

22. The article of any of embodiments 19 to 21, wherein the patterned material comprises an electrically-conductive metal or precursor thereof selected from the group consisting of gold, silver, copper, palladium, platinum, nickel, and precursors thereof.

23. The article of any of embodiments 19 to 22, wherein the patterned material comprises a free radical curable composition, an acid catalyzed curable composition, or a mixture of both a free radical curable composition and an acid catalyzed curable composition.

24. The article of any of embodiments 19 to 23, wherein the patterned material comprises metal particles dispersed within a photocured or thermally cured composition.

25. The article of any of embodiments 19 to 24, wherein the patterned material comprises particles of gold, silver, copper, palladium, or platinum dispersed within a photocured or thermally cured composition derived from both a free radical curable composition and an acid catalyzed curable composition.

26. A method for providing a primed article with a patterned material of any of embodiments 19 to 25, the method comprising:
providing a transparent polymeric substrate of any of embodiments 13 to 18, and
providing a pattern of a patterned material directly onto the dried primer layer.

27. The method of embodiment 1, wherein at least a portion of the pattern of patterned material comprises lines having an average line width of less than 15 µm.

28. The method of embodiment 26 or 27, wherein the at least a portion of the pattern of patterned material is present in a touch screen region of the primed article.

29. The method of any of embodiments 26 to 28, comprising:
providing the patterned material directly on the dried primer layer by direct contact of the dried primer layer with a relief printing member carrying the patterned material.

30. The method of any of embodiments 26 to 29, wherein the patterned material comprises an electrically-conductive metal or precursor thereof.

31. The method of any of embodiments 26 to 30, wherein the patterned material comprises is a photocurable or thermally curable composition and metal particles.

32. The method of embodiment 31, further comprising:
curing the photocurable or thermally curable composition in the patterned material.

33. The method of any of embodiments 26 to 32, wherein the patterned material comprises a metal particles and the method further comprises:
electrolessly metal plating the pattern of patterned material.

34. A method for providing an electrically-conductive pattern on a transparent polymeric substrate, the method comprising:

providing a transparent polymeric substrate as described in any of embodiments 13 to 18,
providing a pattern of a precursor electrically-conductive material directly onto the dried primer layer, at least a portion of the pattern of precursor electrically-conductive material comprising lines having an average line width of less than 15 µm,
converting the at least a portion of the pattern of precursor electrically-conductive material to a pattern of electrically-conductive material that comprises electrically-conductive lines having an average line width of less than 15 µm.

35. The method of embodiment 34, comprising:
providing the transparent polymeric substrate as a continuous web,
providing one or more individual patterns of a photocurable or thermally curable composition as the precursor electrically-conductive material directly on the dried primer layer in one or more individual portions of the continuous web, respectively, which photocurable or thermally curable composition comprises metal seed particles,
converting each of the one or more individual patterns of photocurable or thermally curable composition by curing to form one or more individual cured patterns in the one or more individual portions, each of the one or more individual cured patterns comprising the metal seed particles, and
electrolessly plating the metal seed particles in each of the one or more individual cured patterns to provide one or more individual electrically-conductive patterns.

36. The method of embodiment 34 or 35, wherein each of the one or more individual electrically-conductive patterns comprises a touch region comprising electrically-conductive lines having an average line width of less than 15 µm.

37. A product article obtained from the method of any of embodiments 34 to 36, wherein the product article comprises at least one pattern of an electrically-conductive material wherein at least a portion of the pattern of electrically-conductive material comprises electrically-conductive lines having an average line width of less than 15 µm, which portion of the pattern of electrically-conductive material is disposed directly on the dried primer layer of the transparent polymeric substrate.

38. A device comprising a transparent film that comprises:
one or more electrically-conductive metal patterns disposed directly on a transparent polymeric substrate of any of embodiments 13 to 18,
wherein each of the one or more electrically-conductive metal patterns comprises a touch region comprising electrically-conductive lines having an average line width of less than 15 µm.

39. The device of embodiment 1, wherein the transparent film has an integrated transmittance of at least 88%, and comprises the dried primer layer disposed directly on the transparent polymer support that is a transparent polyester support.

40. A method for providing a plurality of precursor articles, the method comprising:
providing a continuous web of a transparent polymeric substrate having the properties of any of embodiments 13 to 18,
forming a first curable pattern directly on the dried primer layer in a first portion of the continuous web, the first curable pattern comprising a photocurable or thermally curable composition comprising seed metal particles, by direct contact of the dried primer layer in the first portion of the continuous web with a flexographic printing member carrying the photocurable or thermally composition, advancing the continuous web comprising the first portion comprising the first curable pattern to be proximate a curing station and curing the first curable pattern, thereby forming a first cured pattern on the first portion, which first cured pattern comprises the seed metal particles, forming a second curable pattern directly on the dried primer layer in a second portion of the continuous web, the second curable pattern comprising the same or different photocurable or thermally curable composition comprising the same or different seed metal particles, by direct contact with a flexographic printing member carrying the same or different photocurable or thermally curable composition, advancing the continuous web comprising the second portion comprising the second curable pattern to be proximate a curing station and curing the second curable pattern, thereby forming a second cured pattern on the second portion, which second cured pattern comprises the same or different seed metal particles, optionally, carrying out the forming and advancing features one or more times for additional respective portions of the continuous web using the same or different curable or thermally curable composition and the same or different flexographic printing member to form additional cured patterns on the additional respective portions, and winding up the continuous web comprising first, second, and optional additional cured patterns to form a roll of a plurality of precursor articles.

41. The method of embodiment 40, wherein the same seed metal particles are present in each of the multiple cured patterns, which seed metal particles are gold particles, silver particles, copper particles, palladium particles, or platinum particles.

42. The method of embodiment 40 or 41, wherein the same photocurable or thermally curable composition is used in each forming feature for each curable pattern.

43. The method of any of embodiments 40 to 42, wherein the same photocurable composition is used in each forming feature for each curable pattern, which photocurable composition comprises a free radical curable composition, an acid catalyzed curable composition, or both a free radical curable composition and an acid catalyzed curable composition.

44. The method of any of embodiments 40 to 43, wherein the continuous web has an integrated transmittance of at least 88%, and comprises the dried primer layer disposed directly on the transparent polymer support that is a transparent polyester support.

The following Examples are provided to illustrate the practice of this invention and are not meant to be limiting in any manner.

Example 1

Preparation of Composition-Mixture of Polymer Latexes

Preparation of First Polymer Latex (Latex A):

Poly(glycidyl methacrylate-co-butyl acrylate) was synthesized by adding 652 g of demineralized water to a 2 liter glass reactor. Another 651 g of demineralized water was added to a 2 liter glass head tank. The agitators on both vessels were set at 150 RPM. A nitrogen atmosphere was established in the system, and 30.9 g of Rhodacal® A246L anionic surfactant ("first surfactant") were added to each vessel. The reactor contents temperature was raised to 60° C., and 526 g of glycidyl methacrylate and 92.3 g of n-butyl acrylate were added to the head tank. When the monomer emulsion had been prepared in the head tank and the temperature was at 60° C., 6.16 g of azobis(4-cyano)valeric acid (75%) were added to the reactor. The contents of the head tank were metered into the reactor over 240 minutes and the reactor contents were stirred for two hours at 60° C., followed by addition of 0.48 g of erythorbic acid dissolved in 9 g of water. Then, 1.35 g of 30 weight % hydrogen peroxide dissolved in 47 g of water, were added to the reactor in a dropwise manner. The reactor contents were then stirred for an additional hour at 60° C. The resulting first polymer latex was then cooled to 25° C. and filtered through a 30 μm cloth. This preparation yielded 1900 g of filtered first polymer latex at 32% solids. The first polymer median particle size was determined by UPA to be 53.1 nm.

Preparation of Second Polymer Latex (Latex B):

Poly(glycidyl methacrylate-co-butyl acrylate) was synthesized by adding 675.2 g of demineralized water to a 2-liter glass reactor. To a 2 liter glass head tank were added 674 g of demineralized water. The agitators on both vessels were set at 150 RPM. A nitrogen atmosphere was established in the system, and 7.72 g of Rhodapex® CO-436 anionic surfactant (a "second surfactant") were added to each vessel. The reactor contents temperature was raised to 60° C., and 526 g of glycidyl methacrylate and 92.3 g of n-butyl acrylate were added to the head tank. When the monomer emulsion had been prepared in the head tank and the reactor contents temperature was at 60° C., 6.16 g of azobis(4-cyano)valeric acid (75%) and 2.66 g of a 28% aqueous ammonia solution were added to the reactor. The contents of the head tank were metered into the reactor over 240 minutes and the reactor contents were stirred for two hours at 60° C., followed by addition of 0.48 g of erythorbic acid dissolved in 9 g of water. Then, 1.35 g of 30 weight % hydrogen peroxide dissolved in 47 g of water were added to the reactor in a dropwise fashion. The reactor contents were stirred for an additional hour at 60° C. The resulting second polymer latex was then cooled to 25° C. and filtered through a 30 μm cloth. This preparation yielded 1900 g of filtered second polymer latex at 30.6% solids. The second polymer median particle size was determined by UPA to be 87.1 nm.

The glass transition temperatures of various polymers obtained using emulsion polymerization as described above and different monomer weight ratios were obtained as follows:

| Weight Ratio of Glycidyl Methacrylate to n-Butyl Acrylate | $T_g$ (as measured using DSC) |
| --- | --- |
| 100:0 | 70° C. |
| 85:15 | 43° C. |
| 75:25 | 28° C. |

Example 2

Preparation of Substrates and Articles

Primed poly(ethylene terephthalate) substrates were prepared in the following manner.

Samples of transparent poly(ethylene terephthalate) (PET) film (or support) was were formed by extrusion and casting to a thickness appropriate to yield a biaxially oriented film of 125 μm thickness after stretching in both the machine and transverse directions. Prior to the stretching operation, a primer composition was applied and dried to provide a dried primer layer on both opposing supportive sides of the PET support. The primer compositions tested contained either or both of Latex A and Latex B described above. The resulting primed substrates comprising transparent supports and dried primer layers were then stretched as noted to reduce shrinkage and haze. The various resulting primed substrates A through N and average dry thickness of the resulting dried primer layers are described below in TABLE II.

The primed substrate identified as Sample B described in TABLE II was prepared at a concentration of 20% total latex polymer using first polymer latex (Latex A) and second polymer latex (Latex B) in equal amounts, 0.2 weight % of Saponin in a 50 weight % solution, and 0.033 weight % of Aerodisp® W7512S fumed silica particles (average size of 0.1 nm). The primed substrates identified as Samples A, C, and D through N were prepared in a similar fashion with the amounts of the first polymer latex and second polymer latex varied as noted in TABLE II. The primed substrate identified as Sample D also contained 1 weight % of resorcinol. The primed substrate identified as Sample N was prepared in the same manner as the primer composition identified as Sample A except that Rhodacal® A246L anionic surfactant ("first surfactant") was added to the dispersion in an amount of 2 weight % relative to the total second polymer weight in Latex B (thus, both a first surfactant and a second surfactant were incorporated but the first surfactant was not incorporated as part of a distinct polymer latex).

Example 3

The mixtures of first and second polymer latexes described above and various primed substrates were used to provide printed patterns of patterned material including electrically-conductive patterns in the following manner.

% Surface Polarity:

Based on the known Fowkes energy method, percent surface polarity of a given dry surface (for example, a dried primer layer or a dried layer of a polymer latex) was determined by first measuring the 2 minute contact angle (θ) of each of a drop of water and a drop of diiodomethane on the given dry surface. Knowing the dispersive ($\gamma^d_L$) and polar ($\gamma^p_L$) components of the liquid surface tension ($\gamma_L$) for each of the fluids (see TABLE I below) the polar and dispersive components of the given dry surface were calculated using Equation 1 shown below. The percent surface polarity was then calculated using Equation 2 shown below and in the TABLE I.

TABLE I

| Fluid | $\gamma^d_L$ | $\gamma^p_L$ | $\gamma_L = \gamma^d_L + \gamma^p_L$ |
|---|---|---|---|
| Water | 21.8 | 51.0 | 72.8 |
| Diiodomethane | 48.5 | 2.3 | 50.8 |

Equation 1

$$\gamma_L(1+\cos\theta) = 2[(\gamma^d_L\gamma^d_S)^{1/2} + (\gamma^p_S\gamma^p_S)^{1/2}] \quad 1$$

Equation 2

$$\%\text{ surface polarity} = 100[\gamma^p_S/(\gamma^d_S+\gamma^p_S)] \quad 2$$

Photocurable Compositions ("Inks")

Photocurable Composition 1 (Ink 1):

This photocurable composition (or patterned material) is similar to that described in Invention Example 1 of U.S. Ser. No. 14/174,879 (noted above) and in Invention Example 1 of U.S. Ser. No. 14/197,293 (also noted above), and comprised at least the following components formed into a 100 g aliquot:

14.4 g of epoxy acrylates (CN 153 from Sartomer), 9.9 g of poly(ethylene glycol) diacrylate ($M_n$ of 258, Sigma-Aldrich), 2.1 g of poly(ethylene glycol) diacrylate ($M_n$ of 575, Sigma-Aldrich), 10.8 g of pentaerythritol tetraacrylate (Sigma-Aldrich), 0.8 g of triaryl sulfonium salt hexafluorophosphate mixed in 50% propylene carbonate (Sigma-Aldrich), 0.8 g of triaryl sulfonium salt hexafluoroantimonate mixed in 50% propylene carbonate (Sigma-Aldrich), 2.4 g of free radical photoinitiator hydroxycyclohexyl phenyl ketone (Sigma-Aldrich), 1.2 g of free radical photoinitiator methyl-4'-(methylthio)-2-morpholinopropiophenone (Sigma-Aldrich), 19.5 g of silver nanoparticles (Novacentrix, 20-25 nm average particle size, Ag-25-ST3), 1.1 g of carbon nanoparticles (US1074 from US Nano), 0.001 g of 9-fluorenone (Sigma-Aldrich), and 35 g of 1-methoxy isopropanol (Sigma-Aldrich) solvent.

Photocurable Composition 2 (Ink 2):

This photocurable composition (or patterned material) was prepared similarly to Ink 1, but did not contain 9-fluorenone.

Printing the Photocurable Composition:

Samples of printed patterns of the photocurable composition described above on various primed PET substrates were obtained using a benchtop test printer, "IGT F1 Printability Tester" from IGT Testing Systems Inc., Arlington Heights, Ill., in the flexographic mode. The Anilox roller system that was used to apply the photocurable composition to flexographic printing plates had values of 1.3 BCMI and 1803 lpi, as specified by IGT. The printed patterns were made at ambient temperature using an Anilox force of 20N, a print force of ION, and a print speed of 0.20 m/s.

The flexographic plates used for printing the photocurable composition were samples of the commercially available Kodak Flexcel NX photopolymer plate precursors (Eastman Kodak Company) that had been imaged using a mask that had a predetermined pattern written using the Kodak Square Spot laser technology at a resolution of 12,800 dpi. The exposed flexographic plate precursors were UV exposed and processed (developed) using known conditions suggested for these relief printing members by the manufacturer. The resulting flexographic printing plates were each 1.14 mm thick (including the PET). The backing tape used to mount the flexographic plate to the printing form cylinder was the 1120 Beige tape from 3M Company, which was 20 mil (0.051 cm) thick with had a Shore A of 55. The relief image design in the flexographic printing plates included a grid pattern with fine lines that had a width at the top relief surface of 7 μm. The printed average line widths on the primed PET substrates shown below were obtained from the patterns printed with the noted grid pattern.

After printing, each printed pattern of photocurable composition was irradiated with UV radiation using a Fusion 300 WPI medium pressure mercury lamp providing irradiation wavelengths between 190-1500 nm, with an approximate exposure of 298 mJ/cm² to cure each printed pattern of patterned material. The printed average line widths of the cured patterns were measured in both transmission and reflection mode using an Olympus BH-2 optical microscope.

Electroless Metal Plating:

Intermediate articles comprising the cured patterns on the various primed substrates were electrolessly copper plated by immersing the intermediate articles with the cured patterns m for 7 minutes at 45° C. in a beaker containing Enplate Cu-406 electroless plating solution (Enthone), followed by rinsing with distilled water and drying with nitrogen, to form product articles with electrically-conductive patterns disposed on the primed substrates.

Adhesion Testing ("Tape Removal Test"):

Immediately after electroless plating, a piece of Scotch® 810 Magic Tape adhesive tape from 3M Corporation was applied to an electrolessly plated pattern in each product article and then pulled off the surface of the product article.

TABLE II represents the color of the substrate on the blue-yellow axis and more positive b* values indicate a more yellow appearance in the substrate.

In TABLE II, "YI" represents a yellowness index (E313 standard), which is a calculated value that incorporates CIELAB measurements such that increasing YI values indicate a more yellow appearance in the substrate.

The grid line evaluations were carried out on both supporting sides of the substrate. The line width results were observed to be essentially the same for both supporting sides.

In TABLE II, "Ink" refers to either Ink 1 or Ink 2 as identified above.

TABLE II

| Sample | Latex A | Latex B | Average Thickness (μm) | Total Surface Energy (dyne/cm) | % Surface Polarity | Haze | % T | b* | YI | Coating Appearance | Ink | Gridline width (μm) | Tape removal Test | |
|---|---|---|---|---|---|---|---|---|---|---|---|---|---|---|
| A | 0 | 100 | 0.11 | 50 | 26 | 1.22 | 93.32 | 2.31 | 4.28 | 4 | 2 | 11 | None | Comparison |
| B | 50 | 50 | 0.11 | 51 | 38 | 0.57 | 94.06 | 1.93 | 3.49 | 4 | 2 | 7 | Small amount Cu only | Invention |
| C | 100 | 0 | 0.11 | 59 | 62 | 0.46 | 93.39 | 2.42 | 4.49 | 3 | 2 | No lines/ dewet | complete removal | Comparison |
| D* | 100 | 0 | 0.11 | 54 | 55 | 0.45 | 93.58 | 2.25 | 4.14 | 4 | 2 | Lines broken up | None | Comparison |
| E | 25 | 75 | 0.092 | 46 | 19 | 0.76 | 94.38 | 1.41 | 2.46 | 2 | 1 | 7.4 | None | Invention |
| F | 50 | 50 | 0.092 | 52 | 35 | 0.49 | 94.52 | 1 | 1.68 | 2 | 1 | 6.7 | None | Invention |
| G | 75 | 25 | 0.092 | 48 | 42 | 0.54 | 94.51 | 1.25 | 2.15 | 2 | 1 | 5.2 | None | Invention |
| H* | 50 | 50 | 0.092 | 46 | 24 | 0.66 | 94.28 | 1 | 1.72 | 5 | 1 | 5.5 | None | Invention |
| I | 50 | 50 | 0.083 | 51 | 33 | 0.59 | 94.4 | 0.32 | 0.41 | 2 | 1 | 6.3 | None | Invention |
| J | 50 | 50 | 0.092 | 49 | 39 | 0.57 | 94.5 | 1 | 1.69 | | 1 | 8.5 | None | Invention |
| K | 50 | 50 | 0.092 | 49 | 39 | 0.67 | 94.14 | 1.48 | 2.62 | | 1 | 7.7 | None | Invention |
| L | 60 | 40 | 0.092 | 47 | 38 | 0.46 | 94.55 | 0.84 | 1.38 | | 1 | 8 | None | Invention |
| M | 70 | 30 | 0.092 | 51 | 44 | 0.55 | 94.49 | 0.64 | 1 | | 1 | 8.4 | None | Invention |
| N** | 0 | 100 | 0.092 | 46 | 34 | 0.59 | 94.4 | 1.3 | 2.26 | 5 | 1 | 5.7 | None; small piece of Cu in pad area | Comparison |

*Coating solution contained resorcinol
**First surfactant added to Latex B separately The amount of copper removed by this operation was recorded as an indication of adhesion of the electrolessly plated pattern to the primed PET substrate. The results are shown below in TABLE II.

The coating appearance of each substrate was assessed on a scale of 0 to 5 ratings wherein a "0" rating indicates no visible differences in surface uniformity, a "1" rating indicates barely noticeable surface non-uniformities, a "2" rating indicates minor but noticeable surface non-uniformities, a "3" rating indicates clearly noticeable surface non-uniformities, a "4" rating indicates significant surface non-uniformities including high haze and iridescence, and a "5" rating indicates severe surface non-uniformities including high haze and iridescence.

Also in TABLE II below, haze (%) and "% T" were measured using a Hazegard Plus haze meter (BYK Gardner) wherein "haze" is a measure of light scatter through the substrate and higher numbers affecting its clarity; and "% T" is the measure of integrated transmittance through the substrate with higher numbers indicating higher transparency.

Colorimetry values of each substrate was measured using an Ultrascan XE colorimeter (Hunter) and the results are reported in standard CIELAB nomenclature wherein b* in The printed articles identified as Comparison Examples A, C, and D exhibited similar total surface energy, but different % surface polarity, resulting in differences in printing of the patterned material. Comparison Example A yielded printed electrically-conductive lines having an average line width greater than the average line widths obtained using printed articles identified as Invention Examples B and E through M. The printed articles identified as Comparison Examples C and D exhibited poor printed line quality.

The printed articles identified as Invention Examples B and E through M prepared using a dried primer layer according to the present invention (mixture of first and second polymer latexes) to provide % surface polarity of between 19 and 44, produced electrically-conductive lines having an average line width of less than 10 μm and of good quality and demonstrated good electroless plating performance and adhesion of the electrolessly plated copper to the primed substrate. The printed articles identified as Invention Examples E-G and I-L exhibited particularly good coating appearance, low haze, and low color.

The printed article identified as Comparison Example N demonstrated that mere addition of an additional surfactant ("first surfactant") alone to a single polymer latex ("second"

polymer latex, or Latex B) was not sufficient to provide the necessary coating uniformity. Rather, according to the present invention, the first and second surfactants need to be provided to the dried primer layer by way of the individual first and second polymer latexes.

The printed article identified as Invention Example H did not exhibit the best coating appearance but had desirable electrically-conductive line qualities.

Example 4

Precursor articles containing primed substrates were formed using a photocurable composition similar to that described in Example 1 using a Mark-Andy press at 20 ft/m (6.06 m/min) and process similar to that described in FIG. 1 to provide patterns of the photocurable composition as narrow lines on both supporting sides of a PET support.

The invention has been described in detail with particular reference to certain preferred embodiments thereof, but it will be understood that variations and modifications can be effected within the spirit and scope of the invention.

PARTS LIST 100 flexographic printing system
102 supply roll
104 take-up roll
105 roll-to-roll direction
106 roller
107 roller
110 print module
111 plate cylinder
112 flexographic printing plate (or flexographic printing member)
113 raised features
114 impression cylinder
115 Anilox roller
116 UV curing station
120 print module
121 plate cylinder
122 flexographic printing plate (or flexographic printing member)
124 impression cylinder
125 Anilox roller
126 UV curing station
130 print module
131 plate cylinder
132 flexographic printing plate (or flexographic printing member)
134 impression cylinder
135 Anilox roller
136 UV curing station
140 print module
141 plate cylinder
142 flexographic printing plate (or flexographic printing member)
144 impression cylinder
145 Anilox roller
146 UV curing station
150 substrate (or continuous web)
151 first supporting side
152 second (opposing) supporting side
300 apparatus (or device)
310 touch screen
320 display device
330 touch sensor
340 transparent substrate
341 first supporting side
342 second supporting side
350 electrically-conductive pattern
351 fine lines
352 grid
353 fine lines
354 channel pads
355 grid column
356 interconnect lines
358 connector pads
360 electrically-conductive pattern
361 fine lines
362 grid
363 fine lines
364 channel pads
365 grid row
366 interconnect lines
368 connector pads
380 controller

The invention claimed is:

1. A composition comprising a mixture of a first polymer latex and a second polymer latex,
   wherein the first polymer latex comprises a first polymer and a first surfactant such that a dried coating of the first polymer latex has a surface polarity of at least 50%, and
   wherein the second polymer latex comprises a second polymer and a second surfactant such that a dried coating of the second polymer latex has a surface polarity of less than or equal to 27%, and
   wherein a dried coating of the composition has a surface polarity of at least 15% and up to and including 50%,
   wherein the weight ratio of the first polymer latex to the second polymer latex in the composition is from 1:3 and to and including 3:1,
   wherein:
   the first polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total first polymer weight, which first polymer has a glass transition temperature of at least 25° C. and up to and including 75° C., and the first surfactant is a sodium α-olefin ($C_{14}$-$C_{16}$) sulfonate;
   the second polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total second polymer weight, which second polymer has a glass transition temperature of at least 25° C. and up to and including 75° C., and the second surfactant is an ammonium salt of a sulfated polyethoxy nonylphenol;
   the first surfactant is present in a dried coating of the mixture in an amount of at least 1 weight % and up to and including 3 weight %, based on total dry coating weight;
   the second surfactant is present in a dried coating of the mixture in an amount of at least 0.35 weight % and up to and including 1.1 weight %, based on the total dry coating weight; and
   the total amount of the first and second surfactants in a dry coating of the mixture is less than 3.35 weight %, based on the total dry coating weight.

2. The composition of claim 1, wherein a dried coating of the composition has a surface polarity of at least 28% and up to and including 50%.

3. A substrate comprising a support and a dried primer layer disposed on at least one supporting surface of the support, the dried primer layer comprising a mixture of:
  a first polymer latex comprising a first polymer and a first surfactant such that a dried coating the first polymer latex has a surface polarity of at least 50%, and
  a second polymer latex comprising a second polymer and a second surfactant that is different from the first surfactant such that a dried coating of the second polymer latex has a surface polarity of less than or equal to 27%,
  wherein the dried primer layer has a surface polarity of at least 15% and up to and including 50%,
  wherein the weight ratio of the first polymer latex to the second polymer latex in the dried primer layer is from 1:3 and to and including 3:1, and the first surfactant comprises a sodium α-olefin ($C_{14}$-$C_{16}$) sulfonate, and the second surfactant comprises an ammonium salt of a sulfated polyethoxy nonylphenol.

4. The substrate of claim 3 that has an integrated transmittance of at least 88%.

5. The substrate of claim 3 comprising a transparent polymeric support and having the dried primer layer disposed directly thereon.

6. The substrate of claim 3, wherein at least one of the first polymer and the second polymer comprises a vinyl polymer comprising recurring units derived at least from glycidyl (meth)acrylate.

7. The substrate of claim 6, wherein each of the first polymer latex and the second polymer latex comprises a vinyl polymer independently comprising at least 75 weight % and up to and including 90 weight % of recurring units derived from glycidyl (meth)acrylate, based on the total weight of the vinyl polymer.

8. The substrate of claim 7, wherein at least one of the first polymer latex and the second polymer latex comprises a vinyl polymer further comprising recurring units derived from an alkyl (meth)acrylate having an ester alkyl group having at least 2 carbon atoms.

9. The substrate of claim 3, wherein at least one of the first polymer and the second polymer is crosslinked.

10. The substrate of claim 3, wherein the first polymer and the second polymer independently have glass transition temperatures of at least 25° C.

11. The substrate of claim 3, wherein the first surfactant is a compound represented by R—$CH_2$—CH=CH—$CH_2$—S(=O)$_2$O.Na$^+$ wherein R is a $C_{10}$, $C_{11}$, or $C_{12}$ hydrocarbon group, or mixtures of such compounds with different R groups that are any of $C_{10}$ to $C_{12}$ hydrocarbons groups; and the second surfactant is represented by R'-phenyl-(O—$CH_2CH_2$)$_n$—S(=O)$O_2^-$$NH_4^+$ wherein R' is a $C_8$ to $C_{12}$ hydrocarbon group, and n is 3 to 10.

12. The substrate of claim 3, wherein the first surfactant is present in the dried primer layer in an amount of at least 1 weight % and up to and including 3 weight %, and the second surfactant is present in the dried primer layer in an amount of at least 0.35 weight % and up to and including 1.1 weight %, both based on the total dried primer layer weight.

13. The substrate of claim 3, wherein the total amount of the first and second surfactants in the dried primer layer is up to and including 3.35 weight %, based on the total dried primer layer weight.

14. The substrate of claim 3, wherein the dried primer layer has an average thickness of at least 0.05 µm and up to and including 0.4 µm.

15. The substrate of claim 3, comprising a poly(ethylene terephthalate) or poly(ethylene naphthalate) support.

16. A transparent polymeric substrate comprising a transparent polyester support and a dried primer layer disposed directly on at least one supporting surface of the transparent polyester support,
  wherein:
  (i) the transparent polymeric substrate has an integrated transmittance of at least 88%;
  (ii) the dried primer layer has an average thickness of at least 0.05 µm and up to and including 0.4 µm, and comprises a mixture of:
  a first polymer latex comprising a first polymer and a first surfactant, wherein the first polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total first polymer weight, which first polymer has a glass transition temperature of at least 25° C. and up to and including 75° C., and the first surfactant is a sodium α-olefin ($C_{14}$-$C_{16}$) sulfonate; and
  a second polymer latex comprising a second polymer and a second surfactant that is different from the first surfactant, wherein the second polymer comprises at least 75 weight % and up to and including 90 weight % of recurring units derived from glycidyl (meth)acrylate and at least 10 weight % and up to and including 25 weight % of recurring units derived from n-butyl (meth)acrylate, based on the total second polymer weight, which second polymer has a glass transition temperature of at least 25° C. and up to and including 75° C., and the second surfactant is an ammonium salt of a sulfated polyethoxy nonylphenol;
  (iii) the dried primer layer has a surface polarity of at least 28% and up to and including 50%;
  (iv) the weight ratio of the first polymer latex to the second polymer latex in the dried primer layer is from 1:3 and to and including 3:1;
  (v) the first surfactant is present in the dried primer layer in an amount of at least 1 weight % and up to and including 3 weight %, based on total dried primer weight;
  (vi) the second surfactant is present in the dried primer layer in an amount of at least 0.35 weight % and up to and including 1.1 weight %, based on the total dried primer layer; and
  (vii) the total amount of the first and second surfactants in the dried primer layer is less than 3.35 weight %, based on the total dried primer layer weight.

* * * * *